(12) United States Patent
Kim et al.

(10) Patent No.: US 12,149,956 B2
(45) Date of Patent: Nov. 19, 2024

(54) METHOD FOR TERMINAL TO TRANSMIT AND RECEIVE FEEDBACK SIGNAL IN WIRELESS COMMUNICATION SYSTEM SUPPORTING SIDELINK, AND DEVICE FOR SAME

(71) Applicant: LG Electronics Inc., Seoul (KR)

(72) Inventors: Heejin Kim, Seoul (KR); Seungmin Lee, Seoul (KR); Hanbyul Seo, Seoul (KR)

(73) Assignee: LG Electronics Inc., Seoul (KR)

( * ) Notice: Subject to any disclaimer, the term of this patent is extended or adjusted under 35 U.S.C. 154(b) by 413 days.

(21) Appl. No.: 17/612,806

(22) PCT Filed: Jul. 10, 2020

(86) PCT No.: PCT/KR2020/009113
§ 371 (c)(1),
(2) Date: Nov. 19, 2021

(87) PCT Pub. No.: WO2021/006699
PCT Pub. Date: Jan. 14, 2021

(65) Prior Publication Data
US 2022/0256357 A1    Aug. 11, 2022

(30) Foreign Application Priority Data

Jul. 10, 2019 (KR) .......................... 10-2019-0083245

(51) Int. Cl.
*H04W 16/28* (2009.01)
*H04L 1/1812* (2023.01)
(Continued)

(52) U.S. Cl.
CPC .......... *H04W 16/28* (2013.01); *H04L 1/1812* (2013.01); *H04L 5/0053* (2013.01); *H04W 92/18* (2013.01)

(58) Field of Classification Search
None
See application file for complete search history.

(56) References Cited

U.S. PATENT DOCUMENTS

| | | | | |
|---|---|---|---|---|
| 2019/0132851 | A1* | 5/2019 | Davydov | ............ H04W 72/541 |
| 2020/0212988 | A1* | 7/2020 | Lim | ...................... H04B 7/0695 |
| 2020/0412490 | A1* | 12/2020 | Ryu | ...................... H04L 1/1819 |

FOREIGN PATENT DOCUMENTS

| | | |
|---|---|---|
| WO | WO2017209581 | 12/2017 |
| WO | WO2019004688 | 1/2019 |

OTHER PUBLICATIONS

Huawei, HiSilicon, "Sidelink physical layer procedures for NR V2X," R1- 1900023, Presented at 3GPP TSG RAN WG1 Ad-Hoc Meeting 1901, Taipei, Jan. 21-25, 2019, 13 pages.
(Continued)

*Primary Examiner* — Brian S Roberts
(74) *Attorney, Agent, or Firm* — Fish & Richardson P.C.

(57) ABSTRACT

Disclosed are a method for a first UE to transmit a feedback signal in a wireless communication system supporting sidelink, and a device for same, according to various embodiments. The method for the UE to transmit a feedback signal includes the steps of: receiving a sidelink signal from a second UE; and determining whether to transmit the feedback signal for the first sidelink signal on the basis of the sidelink signal, wherein the sidelink signal includes angle information pertaining to the transmission of the feedback signal, and whether to transmit the feedback signal is determined on the basis of the angle information.

15 Claims, 17 Drawing Sheets

(51) Int. Cl.
    *H04L 5/00*         (2006.01)
    *H04W 92/18*      (2009.01)

(56)            References Cited

OTHER PUBLICATIONS

International Search Report and Written Opinion in International Appln. No. PCT/KR2020/009113, dated Oct. 15, 2020, 18 pages (with English translation).
OPPO, "Physical layer procedure for NR-V2X," R1-1900301, Presented at 3GPP TSG RAN WG1 Ad-Hoc Meeting 1901, Taipei, Jan. 21-25, 2019, 10 pages.
ZTE, Sanechips, "Discussion on PHY procedures for NR V2X," R1-1900775, Presented at 3GPP TSG RAN WG1 Ad-Hoc Meeting 1901, Taipei, Jan. 21-25, 2019, 7 pages.

* cited by examiner (a)

(b)

(a)

(b)

METHOD FOR TERMINAL TO TRANSMIT AND RECEIVE FEEDBACK SIGNAL IN WIRELESS COMMUNICATION SYSTEM SUPPORTING SIDELINK, AND DEVICE FOR SAME

CROSS-REFERENCE TO RELATED APPLICATIONS

This application is a National Stage application under 35 U.S.C. § 371 of International Application No. PCT/KR2020/009113, filed on Jul. 10, 2020, which claims the benefit of Korean Application No. 10-2019-0083245, filed on Jul. 10, 2019. The disclosures of the prior applications are incorporated by reference in their entirety.

TECHNICAL FIELD

The present disclosure relates to a method of transmitting and receiving feedback signals by a User Equipment (UE) in a wireless communication system supportive of a sidelink and apparatus therefor, and more particularly, to a method of performing transmission of a feedback signal based on angle information included in a sidelink signal and apparatus therefor.

BACKGROUND ART

Wireless communication systems have been widely deployed to provide various types of communication services such as voice or data. In general, a wireless communication system is a multiple access system that supports communication of multiple users by sharing available system resources (a bandwidth, transmission power, etc.). Examples of multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multi carrier frequency division multiple access (MC-FDMA) system.

A sidelink (SL) refers to a communication method in which a direct link is established between user equipment (UE), and voice or data is directly exchanged between terminals without going through a base station (BS). SL is being considered as one way to solve the burden of the base station due to the rapidly increasing data traffic.

V2X (vehicle-to-everything) refers to a communication technology that exchanges information with other vehicles, pedestrians, and infrastructure-built objects through wired/wireless communication. V2X may be divided into four types: vehicle-to-vehicle (V2V), vehicle-to-infrastructure (V2I), vehicle-to-network (V2N), and vehicle-to-pedestrian (V2P). V2X communication may be provided through a PC5 interface and/or a Uu interface.

As more and more communication devices require larger communication capacities in transmitting and receiving signals, there is a need for mobile broadband communication improved from the legacy radio access technology. Accordingly, communication systems considering services/UEs sensitive to reliability and latency are under discussion. A next-generation radio access technology in consideration of enhanced mobile broadband communication, massive Machine Type Communication (MTC), and Ultra-Reliable and Low Latency Communication (URLLC) may be referred to as new radio access technology (RAT) or new radio (NR). Even in NR, vehicle-to-everything (V2X) communication may be supported.

FIG. 1 is a diagram comparing RAT-based V2X communication before NR with NR-based V2X communication.

Regarding V2X communication, in RAT prior to NR, a scheme for providing a safety service based on V2X messages such as a basic safety message (BSM), a cooperative awareness message (CAM), and a decentralized environmental notification message (DENM) was mainly discussed. The V2X message may include location information, dynamic information, and attribute information. For example, the UE may transmit a periodic message type CAM and/or an event triggered message type DENM to another UE.

For example, the CAM may include dynamic state information about a vehicle such as direction and speed, vehicle static data such as dimensions, and basic vehicle information such as external lighting conditions and route details. For example, a UE may broadcast the CAM, and the CAM latency may be less than 100 ms. For example, when an unexpected situation such as a breakdown of the vehicle or an accident occurs, the UE may generate a DENM and transmit the same to another UE. For example, all vehicles within the transmission coverage of the UE may receive the CAM and/or DENM. In this case, the DENM may have a higher priority than the CAM.

Regarding V2X communication, various V2X scenarios have been subsequently introduced in NR. For example, the various V2X scenarios may include vehicle platooning, advanced driving, extended sensors, and remote driving.

For example, based on vehicle platooning, vehicles may dynamically form a group and move together. For example, to perform platoon operations based on vehicle platooning, vehicles belonging to the group may receive periodic data from a leading vehicle. For example, the vehicles belonging to the group may reduce or increase the distance between the vehicles based on the periodic data.

For example, based on advanced driving, a vehicle may be semi-automated or fully automated. For example, each vehicle may adjust trajectories or maneuvers based on data acquired from local sensors of nearby vehicles and/or nearby logical entities. Also, for example, each vehicle may share driving intention with nearby vehicles.

For example, on the basis of extended sensors, raw data or processed data acquired through local sensors, or live video data may be exchanged between a vehicle, a logical entity, UEs of pedestrians and/or a V2X application server. Thus, for example, the vehicle may recognize an environment that is improved over an environment that may be detected using its own sensor.

For example, for a person who cannot drive or a remote vehicle located in a dangerous environment, a remote driver or V2X application may operate or control the remote vehicle based on remote driving. For example, when a route is predictable as in the case of public transportation, cloud computing-based driving may be used to operate or control the remote vehicle. For example, access to a cloud-based back-end service platform may be considered for remote driving.

A method to specify service requirements for various V2X scenarios such as vehicle platooning, advanced driving, extended sensors, and remote driving is being discussed in the NR-based V2X communication field.

DISCLOSURE

Technical Task

One technical task of the present disclosure is to provide a method and apparatus for controlling a feedback signal for a sidelink signal to be transmitted by a UE having a valid reception of the sidelink signal for a V2X service in a manner that angle information for specifying a transmission target of the feedback signal is further included in the sidelink signal, thereby efficiently managing a feedback resource, minimizing signaling load, and minimizing power consumption of a UE.

It will be appreciated by those of ordinary skill in the art to which the embodiment(s) pertain that the objects that could be achieved with the embodiment(s) are not limited to what has been particularly described hereinabove and the above and other objects will be more clearly understood from the following detailed description.

Technical Solutions

In one technical aspect of the present disclosure, provided is a method of transmitting a feedback signal by a first User Equipment (UE) in a wireless communication system supportive of a sidelink, the method including receiving a sidelink signal from a second UE and determining whether to transmit the feedback signal for a first sidelink signal based on the sidelink signal, wherein the sidelink signal may include angle information related to the transmission of the feedback signal and wherein whether to transmit the feedback signal may be determined based on the angle information.

The feedback signal may be transmitted if the first UE is located in an angle range specified based on the angle information with reference to a first reference direction.

The sidelink signal may further include information on a threshold distance and wherein the feedback signal is transmitted if a distance between the first UE and the second UE is within the threshold distance and the first UE is located in an angle range specified based on the angle information with reference to a first reference direction.

The sidelink signal may further include information on a threshold related to Reference Signal Received Power (RSRP). The feedback signal may be transmitted if the RSRP measured for the sidelink signal is equal to or greater than the threshold and the first UE is located in an angle range specified based on the angle information with reference to a first reference direction.

The first reference direction may include a direction indicated by the sidelink signal among a plurality of pre-configured reference directions.

The start angle and the offset angle may be acquired based on index information, which is included in the angle information, of a Tx beam used by the second UE.

The angle information may include resource index information of SSB (Synchronization Signal/Physical Broadcast Channel Block) or CSI-RS (Channel State Information-Reference Signal) and the start angle and the offset angle may be acquired based on the resource index information of the SSB or the CSI-RS.

In another technical aspect of the present disclosure, provided is a method of receiving a feedback signal by a second User Equipment (UE) in a wireless communication system supportive of a sidelink, the method including transmitting a sidelink signal to at least one or more first UEs and receiving the feedback signal for a first sidelink signal, wherein the sidelink signal may include angle information for specifying a transmission target of the feedback signal and wherein the feedback signal may be received from a first UE located in an angle range corresponding to the angle information among the at least one or more first UEs.

The feedback signal may be received from the first UE located in an angle range specified based on the angle information with reference to a first reference direction.

The sidelink signal may further include information on a threshold distance and the feedback signal may be received from the first UE having a distance from the second UE within the threshold distance and located in an angle range specified based on the angle information with reference to a first reference direction.

The first reference direction may be indicated over the sidelink signal.

The sidelink signal may include a start angle and an offset angle as the angle information.

The sidelink signal may include index information of a Tx beam as the angle information.

In another technical aspect of the present disclosure, provided is a first User Equipment (UE) transmitting a feedback signal in a wireless communication system supportive of a sidelink, the first UE including a Radio Frequency (RF) transceiver and a processor connected to the RF transceiver, the processor configured to receive a sidelink signal from a second UE by controlling the RF transceiver and determine whether to transmit a feedback signal for the first sidelink signal based on the sidelink signal, wherein the sidelink signal may include angle information related to the transmission of the feedback signal and wherein whether to transmit the feedback signal may be determined based on the angle information.

In another technical aspect of the present disclosure, provided is a method of transmitting a feedback signal by a first User Equipment (UE) in a wireless communication system supportive of a sidelink, the method including receiving a sidelink signal from a second UE and determining whether to transmit the feedback signal for a first sidelink signal based on the sidelink signal, wherein the sidelink signal may include beam information necessary for determination of a Rx or Tx beam and wherein whether to transmit the feedback signal may be determined based on the beam information.

The first UE may acquire angle information for determining whether to transmit the feedback signal based on at least one of a direction of a beam included in the beam information, a beam width, number of beam(s), an antenna port index linked to the beam, a resource index of SSB (Synchronization Signal/Physical Broadcast Channel Block), or a resource index of CSI-RS (Channel State Information-Reference Signal) and whether to transmit the feedback signal may be determined based on the angle information.

In another technical aspect of the present disclosure, provided is a second User Equipment (UE) receiving a feedback signal in a wireless communication system supportive of a sidelink, the second UE including a Radio Frequency (RF) transceiver and a processor connected to the RF transceiver, the processor configured to transmit a sidelink signal to at least one or more first UEs by controlling the RF transceiver and receive the feedback signal for a first sidelink signal, wherein the sidelink signal may include angle information for specifying a transmission target of the feedback signal and wherein the feedback signal may be received from a first UE located in an angle range corresponding to the angle information among the at least one or more first UEs.

In another technical aspect of the present disclosure, provided is a chipset transmitting a feedback signal in a wireless communication system supportive of a sidelink, the chipset including at least one processor and at least one memory operatively connected to the at least one processor and enabling the at least one processor to perform an operation when executed, the operation including receiving a sidelink signal from another UE and determining whether to transmit the feedback signal for a first sidelink signal based on the sidelink signal, wherein the sidelink signal may include angle information related to the transmission of the feedback signal and wherein whether to transmit the feedback signal may be determined based on the angle information.

The processor may control a driving mode of a device connected to the chipset based on the feedback signal.

In further technical aspect of the present disclosure, provided is a computer-readable storage medium including at least one computer program enabling at least one processor to perform an operation of transmitting a feedback signal in a wireless communication system supportive of a sidelink, the computer-readable storage medium including at least one computer program enabling the at least one processor to perform an operation of transmitting a feedback signal and storing the at least one computer program, wherein the operation may include receiving a sidelink signal from another UE and determining whether to transmit the feedback signal for a first sidelink signal based on the sidelink signal, wherein the sidelink signal may include angle information related to the transmission of the feedback signal, and wherein whether to transmit the feedback signal may be determined based on the angle information.

Advantageous Effects

According to various embodiments, a feedback signal for a sidelink signal is controlled to be transmitted by a UE having a valid reception of the sidelink signal for a V2X service in a manner that angle information for specifying a transmission target of the feedback signal is further included in the sidelink signal, thereby efficiently managing a feedback resource, minimizing signaling load, and minimizing power consumption of a UE.

Effects to be achieved by embodiment(s) are not limited to what has been particularly described hereinabove and other effects not mentioned herein will be more clearly understood by persons skilled in the art to which embodiment(s) pertain from the following detailed description.

DESCRIPTION OF DRAWINGS

The accompanying drawings, which are included to provide a further understanding of the disclosure and are incorporated in and constitute a part of this application, illustrate embodiments of the disclosure and together with the description serve to explain the principle of the disclosure.

BEST MODE FOR DISCLOSURE

Figure 1:
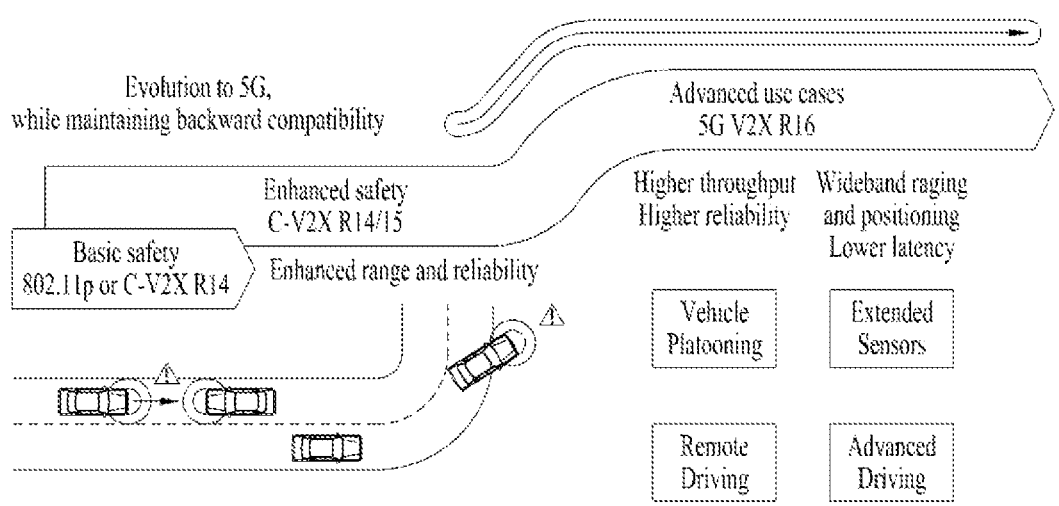
FIG. 1 is a diagram for explaining by comparing V2X communication based on RAT before NR and V2X communication based on NR.

The wireless communication system is a multiple access system that supports communication with multiple users by sharing available system resources (e.g., bandwidth, transmission power, etc.). Examples of the multiple access system include a code division multiple access (CDMA) system, a frequency division multiple access (FDMA) system, a time division multiple access (TDMA) system, an orthogonal frequency division multiple access (OFDMA) system, a single carrier frequency (SC-FDMA) system, a multi carrier frequency division multiple access (MC-FDMA) system, and the like.

A sidelink refers to a communication scheme in which a direct link is established between user equipments (UEs) to directly exchange voice or data between UEs without assistance from a base station (BS). The sidelink is being considered as one way to address the burden on the BS caused by rapidly increasing data traffic.

Vehicle-to-everything (V2X) refers to a communication technology for exchanging information with other vehicles, pedestrians, and infrastructure-built objects through wired/wireless communication. V2X may be divided into four types: vehicle-to-vehicle (V2V), vehicle-to-infrastructure (V2I), vehicle-to-network (V2N), and vehicle-to-pedestrian (V2P). V2X communication may be provided through a PC5 interface and/or a Uu interface.

As more and more communication devices require larger communication capacities in transmitting and receiving signals, there is a need for mobile broadband communication improved from the legacy radio access technology. Accordingly, communication systems considering services/UEs sensitive to reliability and latency are under discussion. A next-generation radio access technology in consideration of enhanced mobile broadband communication, massive MTC, and Ultra-Reliable and Low Latency Communication (URLLC) may be referred to as new radio access technology (RAT) or new radio (NR). Even in NR, V2X communication may be supported.

Techniques described herein may be used in various wireless access systems such as code division multiple access (CDMA), frequency division multiple access (FDMA), time division multiple access (TDMA), orthogonal frequency division multiple access (OFDMA), single carrier-frequency division multiple access (SC-FDMA), etc. CDMA may be implemented as a radio technology such as universal terrestrial radio access (UTRA) or CDMA2000. TDMA may be implemented as a radio technology such as global system for mobile communications (GSM)/general packet radio service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, evolved-UTRA (E-UTRA) etc. UTRA is a part of universal mobile telecommunications system (UMTS). 3GPP LTE is a part of Evolved UMTS (E-UMTS) using E-UTRA. 3GPP LTE employs OFDMA for downlink and SC-FDMA for uplink. LTE-A is an evolution of 3GPP LTE. 3GPP NR (New Radio or New Radio Access Technology) is an evolved version of 3GPP LTE/LTE-A/LTE-A pro.

5G NR is a successor technology of LTE-A, and is a new clean-slate mobile communication system with characteristics such as high performance, low latency, and high availability. 5G NR may utilize all available spectrum resources, from low frequency bands below 1 GHz to intermediate frequency bands from 1 GHz to 10 GHz and high frequency (millimeter wave) bands above 24 GHz.

Figure 2:
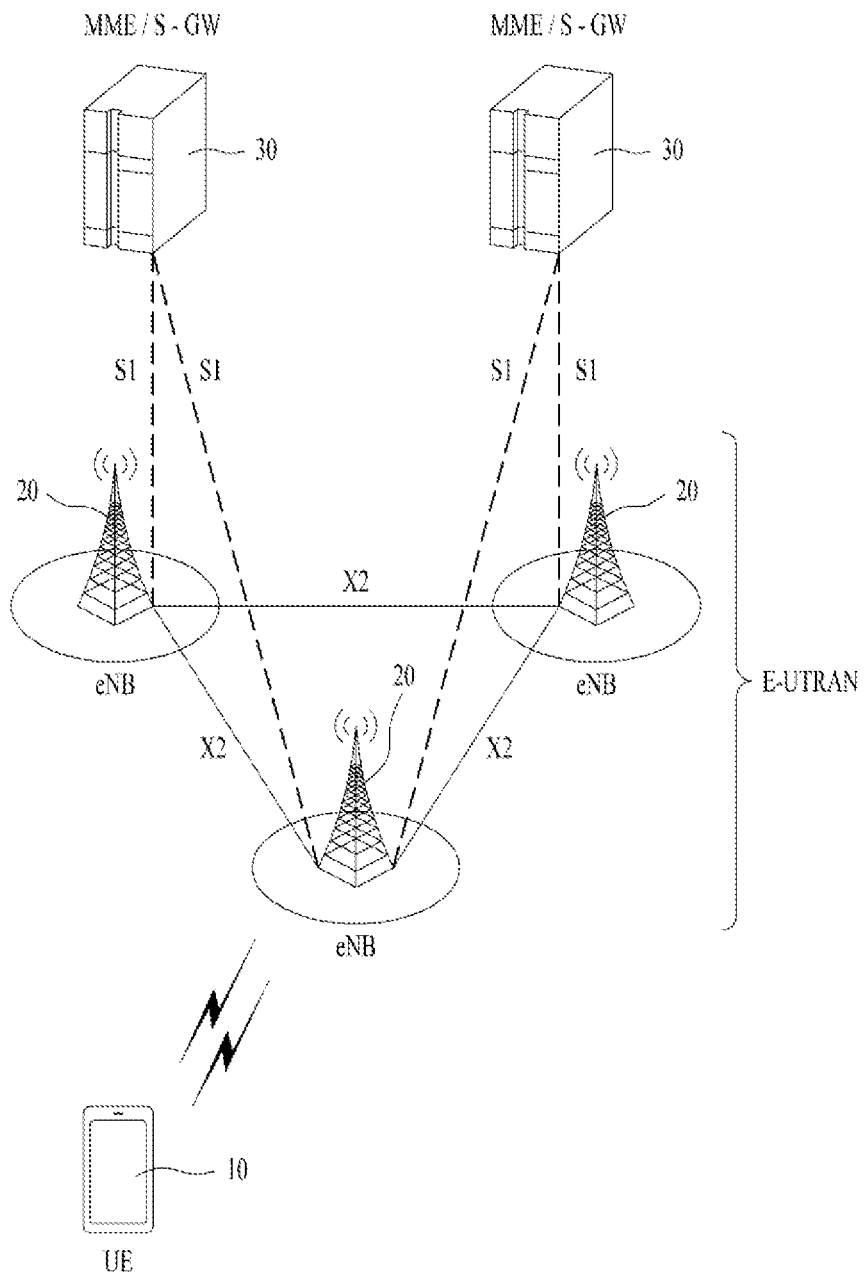
FIG. 2 illustrates the structure of an LTE system to which embodiment(s) are applicable.

For clarity of explanation, LTE-A or 5G NR is mainly described, but the technical spirit of the embodiment(s) is not limited thereto FIG. 2 illustrates the structure of an LTE system to which the present disclosure is applicable. This may also be called an evolved UMTS terrestrial radio access network (E-UTRAN) or LTE/LTE-A system.

Referring to FIG. 2, the E-UTRAN includes evolved Node Bs (eNBs) 20 which provide a control plane and a user plane to UEs 10. A UE 10 may be fixed or mobile, and may also be referred to as a mobile station (MS), user terminal (UT), subscriber station (SS), mobile terminal (MT), or wireless device. An eNB 20 is a fixed station communication with the UE 10 and may also be referred to as a base station (BS), a base transceiver system (BTS), or an access point.

eNBs 20 may be connected to each other via an X2 interface. An eNB 20 is connected to an evolved packet core (EPC) 39 via an S1 interface. More specifically, the eNB 20 is connected to a mobility management entity (MME) via an S1-MME interface and to a serving gateway (S-GW) via an S1-U interface.

The EPC 30 includes an MME, an S-GW, and a packet data network-gateway (P-GW). The MME has access information or capability information about UEs, which are mainly used for mobility management of the UEs. The S-GW is a gateway having the E-UTRAN as an end point, and the P-GW is a gateway having a packet data network (PDN) as an end point.

Based on the lowest three layers of the open system interconnection (OSI) reference model known in communication systems, the radio protocol stack between a UE and a network may be divided into Layer 1 (L1), Layer 2 (L2) and Layer 3 (L3). These layers are defined in pairs between a UE and an Evolved UTRAN (E-UTRAN), for data transmission via the Uu interface. The physical (PHY) layer at L1 provides an information transfer service on physical channels. The radio resource control (RRC) layer at L3 functions to control radio resources between the UE and the network. For this purpose, the RRC layer exchanges RRC messages between the UE and an eNB.

Figure 3:
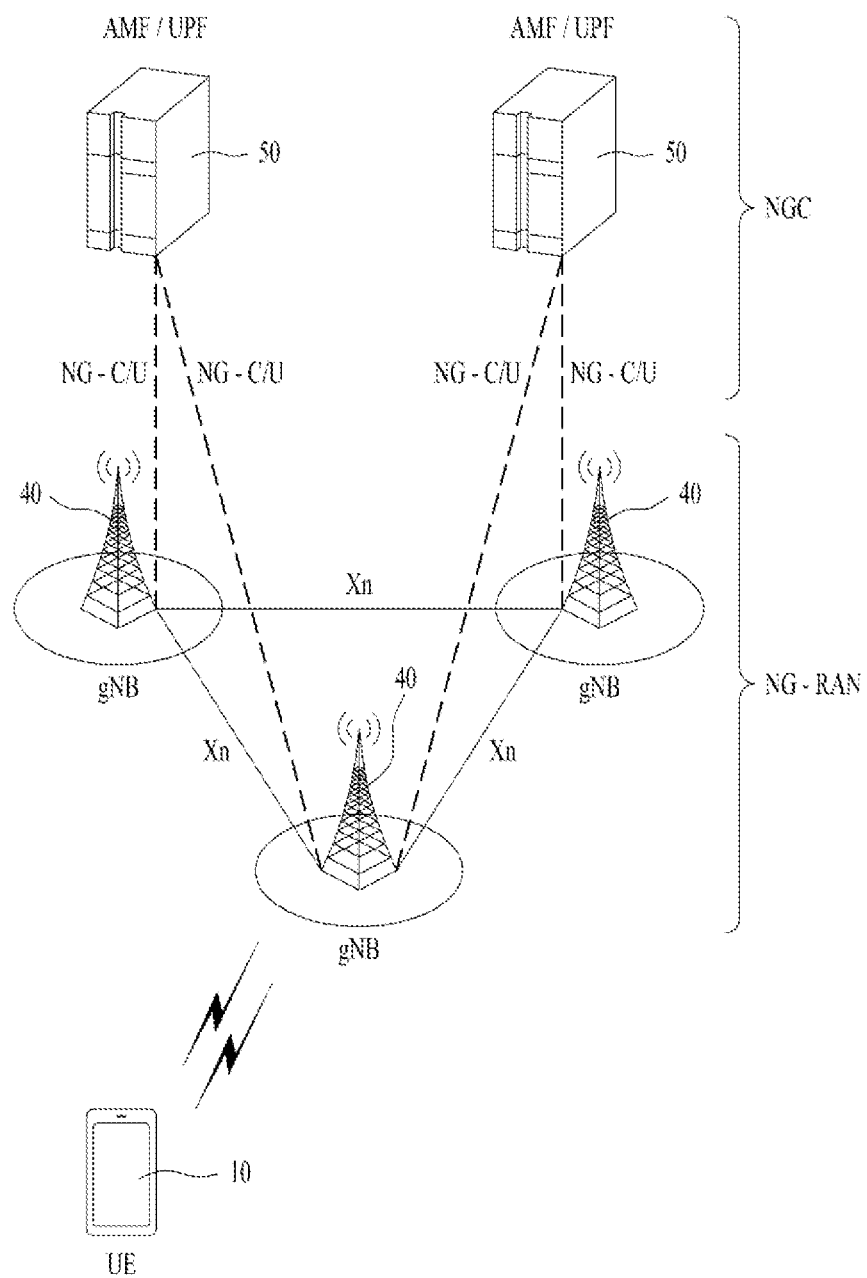
FIG. 3 illustrates the structure of an NR system to which embodiment(s) are applicable.

FIG. 3 illustrates the structure of a NR system to which the present disclosure is applicable.

Referring to FIG. 3, a next generation radio access network (NG-RAN) may include a next generation Node B (gNB) and/or an eNB, which provides user-plane and control-plane protocol termination to a UE. In FIG. 3, the NG-RAN is shown as including only gNBs, by way of example. A gNB and an eNB are connected to each other via an Xn interface. The gNB and the eNB are connected to a 5G core network (5GC) via an NG interface. More specifically, the gNB and the eNB are connected to an access and mobility management function (AMF) via an NG-C interface and to a user plane function (UPF) via an NG-U interface.

Figure 4:
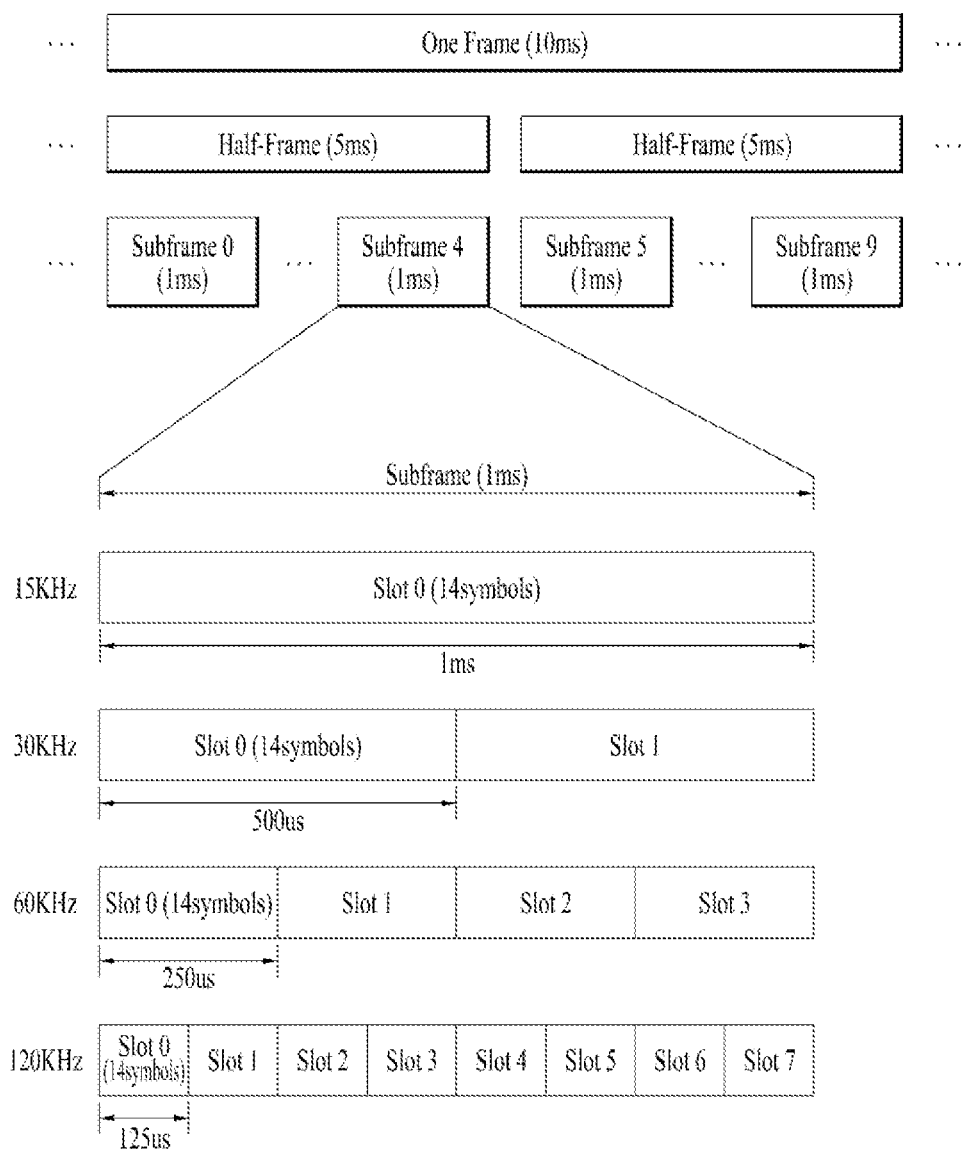
FIG. 4 illustrates the structure of an NR radio frame to which embodiment(s) are applicable.

FIG. 4 illustrates the structure of a NR radio frame to which the present disclosure is applicable.

Referring to FIG. 4, a radio frame may be used for UL transmission and DL transmission in NR. A radio frame is 10 ms in length, and may be defined by two 5-ms half-frames. An HF may include five 1-ms subframes. A subframe may be divided into one or more slots, and the number of slots in an SF may be determined according to a subcarrier spacing (SCS). Each slot may include 12 or 14 OFDM(A) symbols according to a cyclic prefix (CP).

In a normal CP (NCP) case, each slot may include 14 symbols, whereas in an extended CP (ECP) case, each slot may include 12 symbols. Herein, a symbol may be an OFDM symbol (or CP-OFDM symbol) or an SC-FDMA symbol (or DFT-s-OFDM symbol).

Table 1 below lists the number of symbols per slot $N^{slot}_{symb}$, the number of slots per frame $N^{frame,\mu}_{slot}$, and the number of slots per subframe $N^{subframe,\mu}_{slot}$ according to an SCS configuration μ in the NCP case.

TABLE 1

| SCS (15 * 2^u) | $N^{slot}_{symb}$ | $N^{frame,\mu}_{slot}$ | $N^{subframe,\mu}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

Table 2 below lists the number of symbols per slot, the number of slots per frame, and the number of slots per subframe according to an SCS in the ECP case.

TABLE 2

| SCS (15 * 2^u) | $N^{slot}_{symb}$ | $N^{frame,\mu}_{slot}$ | $N^{subframe,\mu}_{slot}$ |
|---|---|---|---|
| 60 KHz (u = 2) | 12 | 40 | 4 |

In the NR system, different OFDM(A) numerologies (e.g., SCSs, CP lengths, etc.) may be configured for a plurality of cells aggregated for one UE. Thus, the (absolute) duration of a time resource (e.g., SF, slot, or TTI) including the same number of symbols may differ between the aggregated cells (such a time resource is commonly referred to as a time unit (TU) for convenience of description).

In NR, multiple numerologies or SCSs to support various 5G services may be supported. For example, a wide area in conventional cellular bands may be supported when the SCS is 15 kHz, and a dense urban environment, lower latency, and a wider carrier bandwidth may be supported when the SCS is 30 kHz/60 kHz. When the SCS is 60 kHz or higher, a bandwidth wider than 24.25 GHz may be supported to overcome phase noise.

The NR frequency band may be defined as two types of frequency ranges. The two types of frequency ranges may be FR1 and FR2. The numerical values of the frequency ranges may be changed. For example, the two types of frequency ranges may be configured as shown in Table 3 below. Among the frequency ranges used in the NR system, FR1 may represent "sub 6 GHz range" and FR2 may represent "above 6 GHz range" and may be called millimeter wave (mmW).

TABLE 3

| Frequency Range designation | Corresponding frequency range | Subcarrier Spacing (SCS) |
|---|---|---|
| FR1 | 450 MHz-6000 MHz | 15, 30, 60 kHz |
| FR2 | 24250 MHz-52600 MHz | 60, 120, 240 kHz |

As mentioned above, the numerical values of the frequency ranges of the NR system may be changed. For example, FR1 may include a band of 410 MHz to 7125 MHz as shown in Table 4 below. That is, FR1 may include a frequency band of 6 GHz (or 5850 MHz, 5900 MHz, 5925 MHz, etc.) or higher. For example, the frequency band of 6 GHz (or 5850 MHz, 5900 MHz, 5925 MHz, etc.) or higher included in FR1 may include an unlicensed band. The unlicensed band may be used for various purposes, for example, for communication for vehicles (e.g., autonomous driving).

TABLE 4

| Frequency Range designation | Corresponding frequency range | Subcarrier Spacing (SCS) |
|---|---|---|
| FR1 | 410 MHz-7125 MHz | 15, 30, 60 kHz |
| FR2 | 24250 MHz-52600 MHz | 60, 120, 240 kHz |

Figure 5:
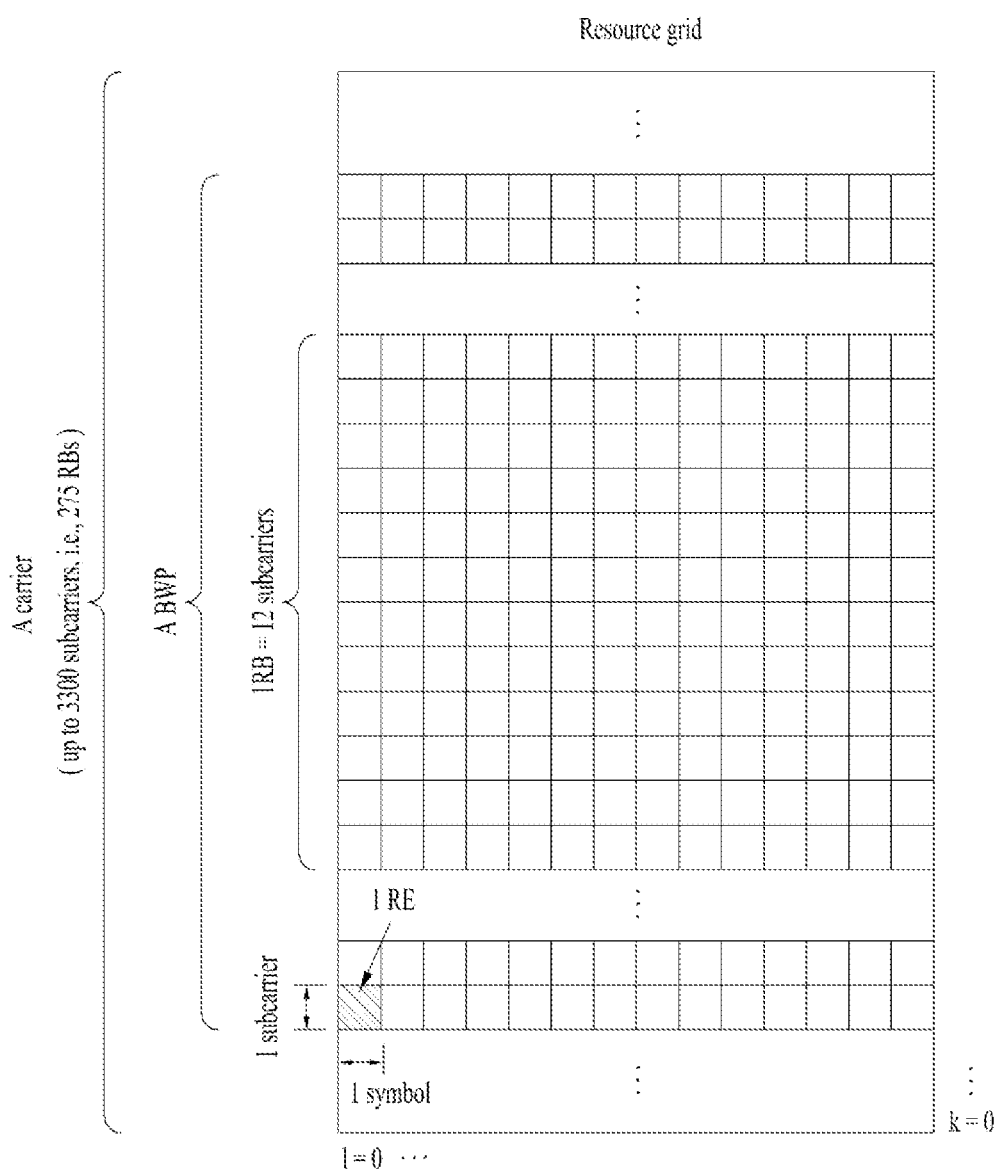
FIG. 5 illustrates the slot structure of an NR frame to which embodiment(s) are applicable.

FIG. 5 illustrates the slot structure of a NR frame to which the present disclosure is applicable.

Referring to FIG. 5, one slot includes a plurality of symbols in the time domain. For example, one slot may include 14 symbols in a normal CP and 12 symbols in an extended CP. Alternatively, one slot may include 7 symbols in the normal CP and 6 symbols in the extended CP.

A carrier may include a plurality of subcarriers in the frequency domain. A resource block (RB) is defined as a plurality of consecutive subcarriers (e.g., 12 subcarriers) in the frequency domain. A bandwidth part (BWP) may be defined as a plurality of consecutive (P)RBs in the frequency domain, and the BWP may correspond to one numerology (e.g., SCS, CP length, etc.). The carrier may include up to N (e.g., 5) BWPs. Data communication may be conducted in an activated BWP. In a resource grid, each element may be referred to as a resource element (RE) and may be mapped to one complex symbol.

The wireless interface between UEs or the wireless interface between a UE and a network may be composed of an L1 layer, an L2 layer, and an L3 layer. In various embodiments of the present disclosure, the L1 layer may represent a physical layer. The L2 layer may represent, for example, at least one of a MAC layer, an RLC layer, a PDCP layer, and an SDAP layer. The L3 layer may represent, for example, an RRC layer.

Hereinafter, V2X or sidelink (SL) communication will be described.

Figure 6:
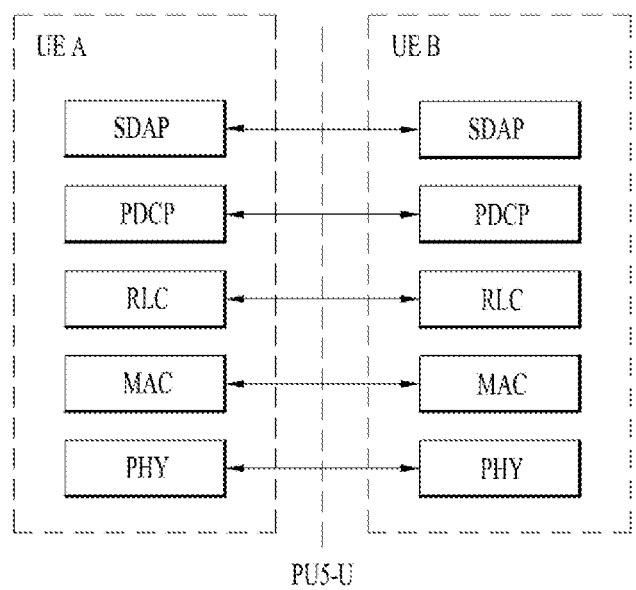
FIG. 6 illustrates a radio protocol architecture for SL communication.
Figure 6:
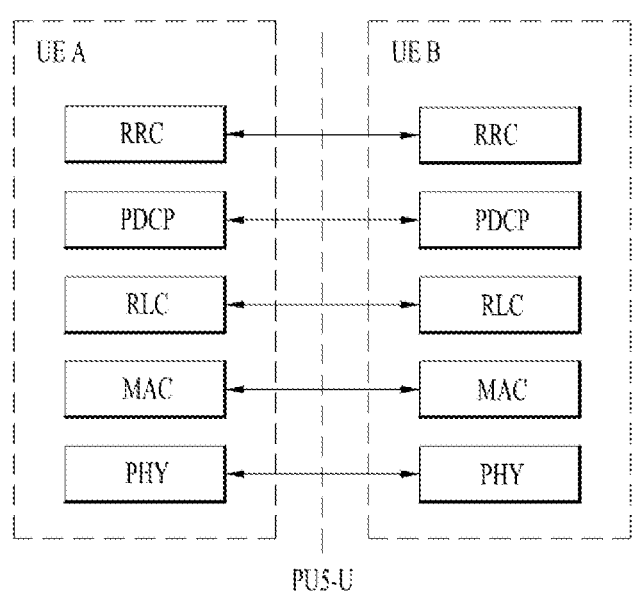

FIG. 6 illustrates a radio protocol architecture for SL communication. Specifically, FIG. 6-(a) shows a user plane protocol stack of NR, and FIG. 6-(b) shows a control plane protocol stack of NR.

Hereinafter, a sidelink synchronization signal (SLSS) and synchronization information will be described.

The SLSS is an SL-specific sequence, and may include a primary sidelink synchronization signal (PSSS) and a secondary sidelink synchronization signal (SSSS). The PSSS may be referred to as a sidelink primary synchronization signal (S-PSS), and the SSSS may be referred to as a sidelink secondary synchronization signal (S-SSS). For example, length-127 M-sequences may be used for the S-PSS, and length-127 gold sequences may be used for the S-SSS. For example, the UE may detect an initial signal and acquire synchronization using the S-PSS. For example, the UE may acquire detailed synchronization using the S-PSS and the S-SSS, and may detect a synchronization signal ID.

A physical sidelink broadcast channel (PSBCH) may be a (broadcast) channel on which basic (system) information that the UE needs to know first before transmission and reception of an SL signal is transmitted. For example, the basic information may include SLSS related information, a duplex mode (DM), time division duplex uplink/downlink (TDD UL/DL) configuration, resource pool related information, the type of an application related to the SLSS, a subframe offset, and broadcast information. For example, for evaluation of PSBCH performance, the payload size of PSBCH in NR V2X may be 56 bits including CRC of 24 bits.

The S-PSS, S-SSS, and PSBCH may be included in a block format (e.g., an SL synchronization signal (SS)/PSBCH block, hereinafter sidelink-synchronization signal block (S-SSB)) supporting periodic transmission. The S-SSB may have the same numerology (i.e., SCS and CP length) as a physical sidelink control channel (PSCCH)/physical sidelink shared channel (PSSCH) in the carrier, and the transmission bandwidth thereof may be within a (pre)set sidelink BWP (SL BWP). For example, the bandwidth of the S-SSB may be 11 resource blocks (RBs). For example, the PSBCH may span 11 RBs. The frequency position of the S-SSB may be (pre)set. Accordingly, the UE does not need to perform hypothesis detection at a frequency to discover the S-SSB in the carrier.

In the NR SL system, a plurality of numerologies having different SCSs and/or CP lengths may be supported. In this case, as the SCS increases, the length of the time resource in which the transmitting UE transmits the S-SSB may be shortened. Thereby, the coverage of the S-SSB may be narrowed. Accordingly, in order to guarantee the coverage of the S-SSB, the transmitting UE may transmit one or more S-SSBs to the receiving UE within one S-SSB transmission period according to the SCS. For example, the number of S-SSBs that the transmitting UE transmits to the receiving UE within one S-SSB transmission period may be preconfigured or configured for the transmitting UE. For example, the S-SSB transmission period may be 160 ms. For example, for all SCSs, the S-SSB transmission period of 160 ms may be supported.

For example, when the SCS is 15 kHz in FR1, the transmitting UE may transmit one or two S-SSBs to the receiving UE within one S-SSB transmission period. For example, when the SCS is 30 kHz in FR1, the transmitting UE may transmit one or two S-SSBs to the receiving UE within one S-SSB transmission period. For example, when the SCS is 60 kHz in FR1, the transmitting UE may transmit one, two, or four S-SSBs to the receiving UE within one S-SSB transmission period.

For example, when the SCS is 60 kHz in FR2, the transmitting UE may transmit 1, 2, 4, 8, 16 or 32 S-SSBs to the receiving UE within one S-SSB transmission period. For example, when SCS is 120 kHz in FR2, the transmitting UE may transmit 1, 2, 4, 8, 16, 32 or 64 S-SSBs to the receiving UE within one S-SSB transmission period.

When the SCS is 60 kHz, two types of CPs may be supported. In addition, the structure of the S-SSB transmitted from the transmitting UE to the receiving UE may depend on the CP type. For example, the CP type may be normal CP (NCP) or extended CP (ECP). Specifically, for example, when the CP type is NCP, the number of symbols to which the PSBCH is mapped in the S-SSB transmitted by the transmitting UE may be 9 or 8. On the other hand, for example, when the CP type is ECP, the number of symbols to which the PSBCH is mapped in the S-SSB transmitted by the transmitting UE may be 7 or 6. For example, the PSBCH may be mapped to the first symbol in the S-SSB transmitted by the transmitting UE. For example, upon receiving the S-SSB, the receiving UE may perform an automatic gain control (AGC) operation in the period of the first symbol for the S-SSB.

Figure 7:
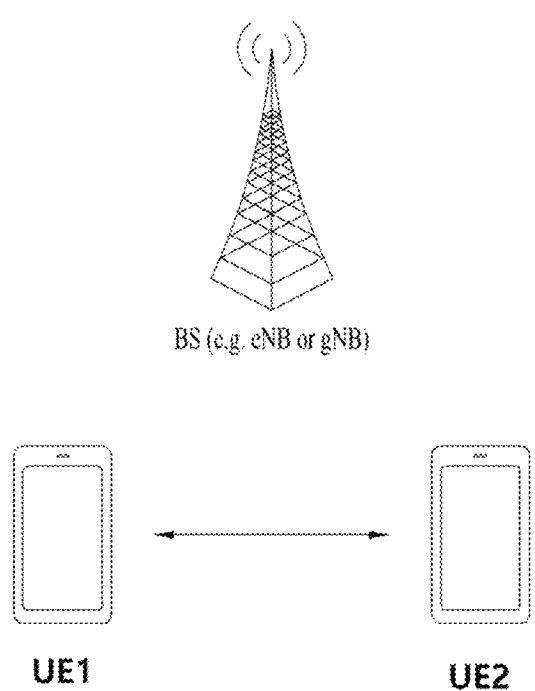
FIG. 7 illustrates UEs performing V2X or SL communication.

FIG. 7 illustrates UEs performing V2X or SL communication.

Referring to FIG. 7, in V2X or SL communication, the term UE may mainly refer to a user's UE. However, when network equipment such as a BS transmits and receives signals according to a communication scheme between UEs, the BS may also be regarded as a kind of UE. For example, UE 1 may be the first device 100, and UE 2 may be the second device 200.

For example, UE 1 may select a resource unit corresponding to a specific resource in a resource pool, which represents a set of resources. Then, UE 1 may transmit an SL signal through the resource unit. For example, UE 2, which is a receiving UE, may receive a configuration of a resource pool in which UE 1 may transmit a signal, and may detect a signal of UE 1 in the resource pool.

Here, when UE 1 is within the connection range of the BS, the BS may inform UE 1 of a resource pool. On the other hand, when the UE 1 is outside the connection range of the BS, another UE may inform UE 1 of the resource pool, or UE 1 may use a preconfigured resource pool.

In general, the resource pool may be composed of a plurality of resource units, and each UE may select one or multiple resource units and transmit an SL signal through the selected units.

Figure 8:
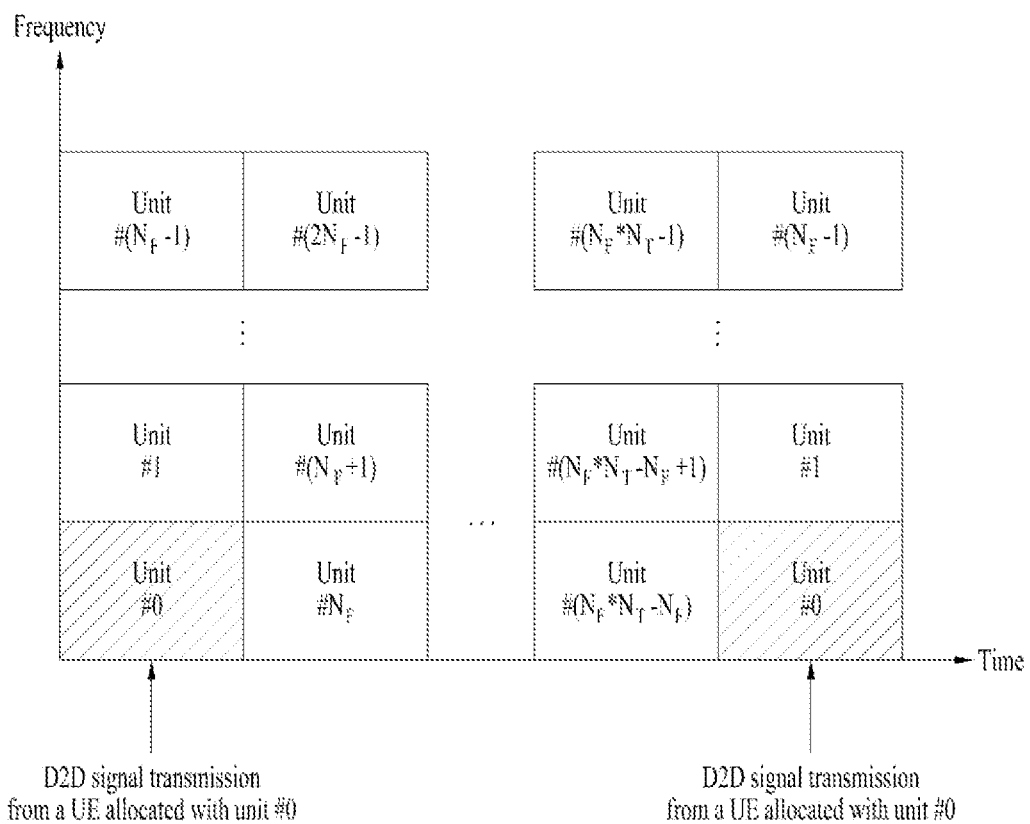
FIG. 8 illustrates resource units for V2X or SL communication.

FIG. 8 illustrates resource units for V2X or SL communication.

Referring to FIG. 8, the frequency resources of a resource pool may be divided into $N_F$ sets, and the time resources of the resource pool may be divided into $N_T$ sets. Accordingly, a total of $N_F*N_T$ resource units may be defined in the resource pool. FIG. 8 shows an exemplary case where the resource pool is repeated with a periodicity of NT subframes.

As shown in FIG. 8, one resource unit (e.g., Unit #0) may appear periodically and repeatedly. Alternatively, in order to obtain a diversity effect in the time or frequency dimension, an index of a physical resource unit to which one logical resource unit is mapped may change in a predetermined pattern over time. In this structure of resource units, the resource pool may represent a set of resource units available to a UE which intends to transmit an SL signal.

Resource pools may be subdivided into several types. For example, according to the content in the SL signal transmitted in each resource pool, the resource pools may be divided as follows.

(1) Scheduling assignment (SA) may be a signal including information such as a position of a resource through which a transmitting UE transmits an SL data channel, a modulation and coding scheme (MCS) or multiple input multiple output (MIMO) transmission scheme required for demodulation of other data channels, and timing advance (TA). The SA may be multiplexed with SL data and transmitted through the same resource unit. In this case, an SA resource pool may represent a resource pool in which SA is multiplexed with SL data and transmitted. The SA may be referred to as an SL control channel.

(2) SL data channel (physical sidelink shared channel (PSSCH)) may be a resource pool through which the transmitting UE transmits user data. When the SA and SL data are multiplexed and transmitted together in the same resource unit, only the SL data channel except for the SA information may be transmitted in the resource pool for the SL data channel. In other words, resource elements (REs) used to transmit the SA information in individual resource units in the SA resource pool may still be used to transmit the SL data in the resource pool of the SL data channel. For example, the transmitting UE may map the PSSCH to consecutive PRBs and transmit the same.

(3) The discovery channel may be a resource pool used for the transmitting UE to transmit information such as the ID thereof. Through this channel, the transmitting UE may allow a neighboring UE to discover the transmitting UE.

Even when the SL signals described above have the same content, they may use different resource pools according to the transmission/reception properties of the SL signals. For example, even when the SL data channel or discovery message is the same among the signals, it may be classified into different resource pools according to determination of the SL signal transmission timing (e.g., transmission at the reception time of the synchronization reference signal or transmission by applying a predetermined TA at the reception time), a resource allocation scheme (e.g., the BS designates individual signal transmission resources to individual transmitting UEs or individual transmission UEs select individual signal transmission resources within the resource pool), signal format (e.g., the number of symbols occupied by each SL signal in a subframe, or the number of subframes used for transmission of one SL signal), signal strength from a BS, the strength of transmit power of an SL UE, and the like.

Hereinafter, resource allocation in the SL will be described.

Figure 9:
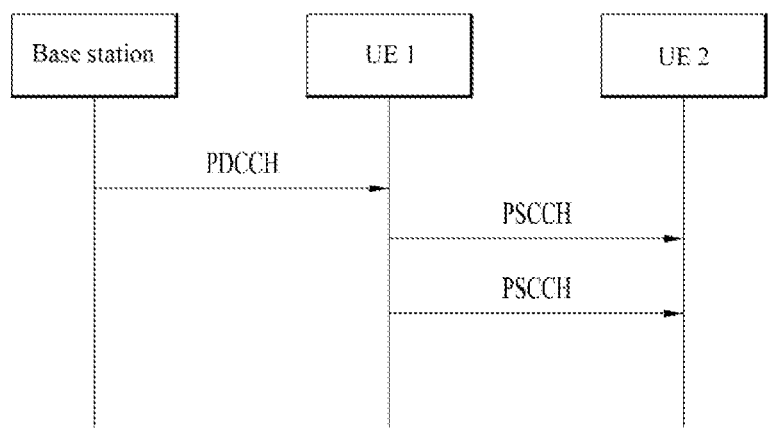
FIG. 9 illustrates a procedure in which UEs perform V2X or SL communication according to a transmission mode.
Figure 9:
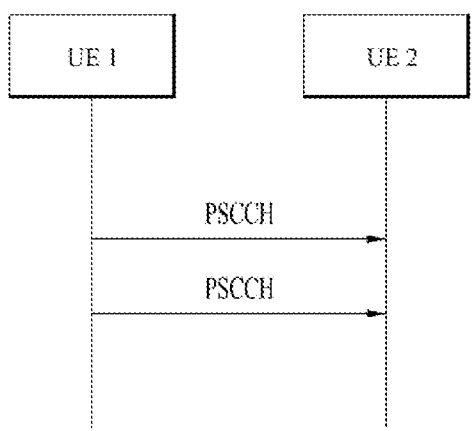

FIG. 9 illustrates a procedure in which UEs perform V2X or SL communication according to a transmission mode. In various embodiments of the present disclosure, the transmission mode may be referred to as a mode or a resource allocation mode. Hereinafter, for simplicity, the transmission mode in LTE may be referred to as an LTE transmission mode, and the transmission mode in NR may be referred to as an NR resource allocation mode.

For example, FIG. 9-(a) illustrates a UE operation related to LTE transmission mode 1 or LTE transmission mode 3. Alternatively, for example, FIG. 9-(a) illustrates a UE operation related to NR resource allocation mode 1. For example, LTE transmission mode 1 may be applied to general SL communication, and LTE transmission mode 3 may be applied to V2X communication.

For example, FIG. 9-(b) illustrates a UE operation related to LTE transmission mode 2 or LTE transmission mode 4. Alternatively, for example, FIG. 9-(b) illustrates a UE operation related to NR resource allocation mode 2.

Referring to FIG. 9-(a), in LTE transmission mode 1, LTE transmission mode 3 or NR resource allocation mode 1, the BS may schedule an SL resource to be used by the UE for SL transmission. For example, the BS may perform resource scheduling for UE 1 through PDCCH (more specifically, downlink control information (DCI)), and UE 1 may perform V2X or SL communication with UE 2 according to the resource scheduling. For example, UE 1 may transmit sidelink control information (SCI) to UE 2 on a physical sidelink control channel (PSCCH), and then transmit data which is based on the SCI to UE 2 on a physical sidelink shared channel (PSSCH).

For example, in NR resource allocation mode 1, the UE may be provided with or allocated resources for one or more SL transmissions of a transport block (TB) from the BS through a dynamic grant. For example, the BS may provide a resource for transmission of the PSCCH and/or PSSCH to the UE using the dynamic grant. For example, the transmitting UE may report the SL hybrid automatic repeat request (HARQ) feedback received from the receiving UE to the BS. In this case, the PUCCH resource and timing for reporting the SL HARQ feedback to the BS may be determined based on an indication in the PDCCH through the BS is to allocate a resource for SL transmission.

For example, DCI may include a slot offset between DCI reception and the first SL transmission scheduled by the DCI. For example, the minimum gap between the DCI scheduling a SL transmission resource and the first scheduled SL transmission resource may not be shorter than the processing time of the corresponding UE.

For example, in NR resource allocation mode 1, the UE may be periodically provided with or allocated a resource set from the BS for a plurality of SL transmissions through a configured grant. For example, the configured grant may include configured grant type 1 or configured grant type 2. For example, the UE may determine a TB to be transmitted in each occasion indicated by a given configured grant.

For example, the BS may allocate SL resources to the UE on the same carrier, and may allocate SL resources to the UE on different carriers.

For example, an NR BS may control LTE-based SL communication. For example, the NR BS may transmit NR DCI to the UE to schedule an LTE SL resource. In this case, for example, a new RNTI for scrambling the NR DCI may be defined. For example, the UE may include an NR SL module and an LTE SL module.

For example, after the UE including the NR SL module and the LTE SL module receives NR SL DCI from the gNB, the NR SL module may transform the NR SL DCI to LTE DCI type 5A, and the NR SL module may deliver LTE DCI type 5A to the LTE SL module in units of X ms. For example, the LTE SL module may apply activation and/or release to the first LTE subframe Z ms after the LTE SL module receives LTE DCI format 5A from the NR SL module. For example, the X may be dynamically indicated using a field of DCI. For example, the minimum value of X may depend on the UE capability. For example, the UE may report a single value according to the UE capability. For example, X may be a positive number.

Referring to FIG. 9-(*b*), in LTE transmission mode 2, LTE transmission mode 4, or NR resource allocation mode 2, the UE may determine AN SL resource within the SL resources configured by the BS/network or the preconfigured SL resources. For example, the configured SL resources or the preconfigured SL resources may be a resource pool. For example, the UE may autonomously select or schedule a resource for SL transmission. For example, the UE may autonomously select a resource within the configured resource pool to perform SL communication. For example, the UE may select a resource within a selection window by performing a sensing and resource (re)selection procedure. For example, the sensing may be performed on a per sub-channel basis. In addition, UE 1, which has selected a resource within the resource pool, may transmit SCI to UE 2 through the PSCCH, and then transmit data, which is based on the SCI, to UE 2 through the PSSCH.

For example, a UE may assist in selecting an SL resource for another UE. For example, in NR resource allocation mode 2, the UE may receive a configured grant for SL transmission. For example, in NR resource allocation mode 2, the UE may schedule SL transmission of another UE. For example, in NR resource allocation mode 2, the UE may reserve an SL resource for blind retransmission.

For example, in NR resource allocation mode 2, UE 1 may indicate the priority of SL transmission to UE 2 using the SCI. For example, UE 2 may decode the SCI. UE 2 may perform sensing and/or resource (re)selection based on the priority. For example, the resource (re)selection procedure may include an operation of identifying candidate resources in a resource selection window by UE 2, and an operation of selecting, by UE 2, a resource for (re)transmission from among the identified candidate resources. For example, the resource selection window may be a time interval during which the UE selects the resource for SL transmission. For example, after UE 2 triggers resource (re)selection, the resource selection window may start at $T1 \geq 0$. The resource selection window may be limited by the remaining packet delay budget of UE 2. For example, in the operation of identifying the candidate resources in the resource selection window by UE 2, a specific resource may be indicated by the SCI received by UE 2 from UE 1. When the L1 SL RSRP measurement value for the specific resource exceeds an SL RSRP threshold, UE 2 may not determine the specific resource as a candidate resource. For example, the SL RSRP threshold may be determined based on the priority of the SL transmission indicated by the SCI received by UE 2 from UE 1 and the priority of the SL transmission on the resource selected by UE 2.

For example, the L1 SL RSRP may be measured based on an SL demodulation reference signal (DMRS). For example, one or more PSSCH DMRS patterns may be configured or preconfigured for each resource pool in the time domain. For example, PDSCH DMRS configuration type 1 and/or type 2 may be the same as or similar to the frequency domain pattern of the PSSCH DMRS. For example, the exact DMRS pattern may be indicated by the SCI. For example, in NR resource allocation mode 2, the transmitting UE may select a specific DMRS pattern from among DMRS patterns configured or preconfigured for the resource pool.

For example, in NR resource allocation mode 2, based on the sensing and resource (re)selection procedure, the transmitting UE may perform initial transmission of a TB without reservation. For example, based on the sensing and resource (re)selection procedure, using the SCI associated with a first TB, the transmitting UE may reserve the SL resource for initial transmission of a second TB.

For example, in NR resource allocation mode 2, the UE may reserve a resource for feedback-based PSSCH retransmission through signaling related to previous transmission of the same TB. For example, the maximum number of SL resources reserved by one transmission including the current transmission may be 2, 3, or 4. For example, the maximum number of SL resources may be the same regardless of whether HARQ feedback is enabled. For example, the maximum number of HARQ (re)transmissions for one TB may be limited by configuration or pre-configuration. For example, the maximum number of HARQ (re)transmissions may be up to 32. For example, when the configuration or pre-configuration is not present, the maximum number of HARQ (re)transmissions may be unspecified. For example, the configuration or pre-configuration may be for the transmitting UE. For example, in NR resource allocation mode 2, HARQ feedback for releasing resources not used by the UE may be supported.

For example, in NR resource allocation mode 2, the UE may indicate to another UE one or more sub-channels and/or slots used by the UE, using the SCI. For example, the UE may indicate to another UE one or more sub-channels and/or slots reserved by the UE for PSSCH (re)transmission, using SCI. For example, the minimum allocation unit of the SL resource may be a slot. For example, the size of the sub-channel may be configured for the UE or may be preconfigured.

Hereinafter, sidelink control information (SCI) will be described.

Control information transmitted by the BS to the UE on the PDCCH may be referred to as downlink control information (DCI), whereas control information transmitted by the UE to another UE on the PSCCH may be referred to as SCI. For example, before decoding the PSCCH, the UE may be aware of the start symbol of the PSCCH and/or the number of symbols of the PSCCH. For example, the SCI may include SL scheduling information. For example, the UE may transmit at least one SCI to another UE to schedule the PSSCH. For example, one or more SCI formats may be defined.

For example, the transmitting UE may transmit the SCI to the receiving UE on the PSCCH. The receiving UE may decode one SCI to receive the PSSCH from the transmitting UE.

For example, the transmitting UE may transmit two consecutive SCIs (e.g., 2-stage SCI) to the receiving UE on the PSCCH and/or the PSSCH. The receiving UE may decode the two consecutive SCIs (e.g., 2-stage SCI) to receive the PSSCH from the transmitting UE. For example, when the SCI configuration fields are divided into two groups in consideration of the (relatively) high SCI payload size, the SCI including a first SCI configuration field group may be referred to as first SCI or 1st SCI, and the SCI including a second SCI configuration field group may be referred to as second SCI or 2nd SCI. For example, the transmitting UE may transmit the first SCI to the receiving UE on the PSCCH. For example, the transmitting UE may transmit the second SCI to the receiving UE on the PSCCH and/or the PSSCH. For example, the second SCI may be transmitted to the receiving UE on the (independent) PSCCH, or may be piggybacked together with data and transmitted on the PSSCH. For example, the two consecutive SCIs may be applied for different transmissions (e.g., unicast, broadcast, or groupcast).

For example, the transmitting UE may transmit some or all of the following information to the receiving UE through SCI. Here, for example, the transmitting UE may transmit some or all of the following information to the receiving UE through the first SCI and/or the second SCI:

PSSCH and/or PSCCH related resource allocation information, for example, the positions/number of time/frequency resources, resource reservation information (e.g., periodicity); and/or SL CSI report request indicator or SL (L1) RSRP (and/or SL (L1) RSRQ and/or SL (L1) RSSI) report request indicator; and/or SL CSI transmission indicator (or SL (L1) RSRP (and/or SL (L1) RSRQ and/or SL (L1) RSSI) information transmission indicator) (on PSSCH); and/or MCS information; and/or transmit power information; and/or L1 destination ID information and/or L1 source ID information; and/or SL HARQ process ID information; and/or new data indicator (NDI) information; and/or redundancy version (RV) information; and/or (transmission traffic/packet related) QoS information; e.g., priority information; and/or SL CSI-RS transmission indicator or information on the number of (transmitted) SL CSI-RS antenna ports;

Location information about the transmitting UE or location (or distance/area) information about a target receiving UE (to which a request for SL HARQ feedback is made); and/or information about a reference signal (e.g., DMRS, etc.) related to decoding and/or channel estimation of data transmitted on the PSSCH, for example, information related to a pattern of a (time-frequency) mapping resource of DMRS, rank information, antenna port index information.

For example, the first SCI may include information related to channel sensing. For example, the receiving UE may decode the second SCI using the PSSCH DMRS. A polar code used for the PDCCH may be applied to the second SCI. For example, in the resource pool, the payload size of the first SCI may be the same for unicast, groupcast and broadcast. After decoding the first SCI, the receiving UE does not need to perform blind decoding of the second SCI. For example, the first SCI may include scheduling information about the second SCI.

In various embodiments of the present disclosure, since the transmitting UE may transmit at least one of SCI, the first SCI, and/or the second SCI to the receiving UE on the PSCCH, the PSCCH may be replaced/substituted with at least one of the SCI, the first SCI, and/or the second SCI. Additionally/alternatively, for example, the SCI may be replaced/substituted with at least one of the PSCCH, the first SCI, and/or the second SCI. Additionally/alternatively, for example, since the transmitting UE may transmit the second SCI to the receiving UE on the PSSCH, the PSSCH may be replaced/substituted with the second SCI.

Hereinafter, synchronization acquisition by an SL UE will be described.

In TDMA and FDMA systems, accurate time and frequency synchronization is essential. Inaccurate time and frequency synchronization may lead to degradation of system performance due to inter-symbol interference (ISI) and inter-carrier interference (ICI). The same is true for V2X. For time/frequency synchronization in V2X, a sidelink synchronization signal (SLSS) may be used in the PHY layer, and master information block-sidelink-V2X (MIB-SL-V2X) may be used in the RLC layer.

Tx/Rx Beam Sweep

In case of using a very high frequency such as mmWave, beamforming may be used to overcome pathloss in general. To use beamforming, a best beam pair should be detected from several beam pairs between a Tx end and an Rx end. Such a process may be referred as beam acquisition or beam tracking from the perspective of the Rx end. Particularly, since mmWave uses analog beamforming, a vehicle may need to perform beam sweeping of switching a beam to a different direction in a different time using an antenna array of the vehicle in the course of beam acquisition or beam tracking.

Analog Beamforming and Beam Management

In case of an NR system, a massive Multi Input Multi Output (MIMO) environment in which the number of Tx/Rx antennas increases massively may be taken into consideration. As the massive MIMO environment is considered, the number of Tx/Rx antennas may increase over tens or hundreds. Meanwhile, the NR system supports communication on above 6 GHz band, i.e., millimeter frequency band. Yet, since the millimeter frequency band uses a very high frequency band, it has the frequency characteristic that signal attenuation according to a distance appears very rapidly. Hence, to compensate the rapid propagation attenuation characteristic, the NR system using at least 6-GHz band uses a beamforming scheme of performing signal transmission in a manner of focusing energy not in omni-direction but in a specific direction.

Specifically, in case that many antennas are required as is the case of a millimeter frequency band, using analog beamforming or hybrid beamforming is considered. According to analog beamforming, a multitude of antenna elements are mapped to one TXRU (transceiver unit) and a direction of beam is controlled by an analog phase shifter.

Meanwhile, to maximize a performance gain of massive MIMO, each antenna element may have a TXRU to adjust a Tx power and phase. According to this, independent beamforming per frequency resource may be enabled. However, it is very difficult to actually install a TXRU at each antenna element.

Therefore, NR is considering a method of controlling a direction of a beam using an analog phase shifter by mapping a multitude of antenna elements to a single TXRU. However, in case of an analog beam, there are a limitation in that a single beam direction can be formed per time instance (e.g., symbol, subframe) and a disadvantage in that severe performance degradation may occur in case of inaccurate Tx-Rx beam pairing.

HARQ Feedback in NR V2X

Figure 10:
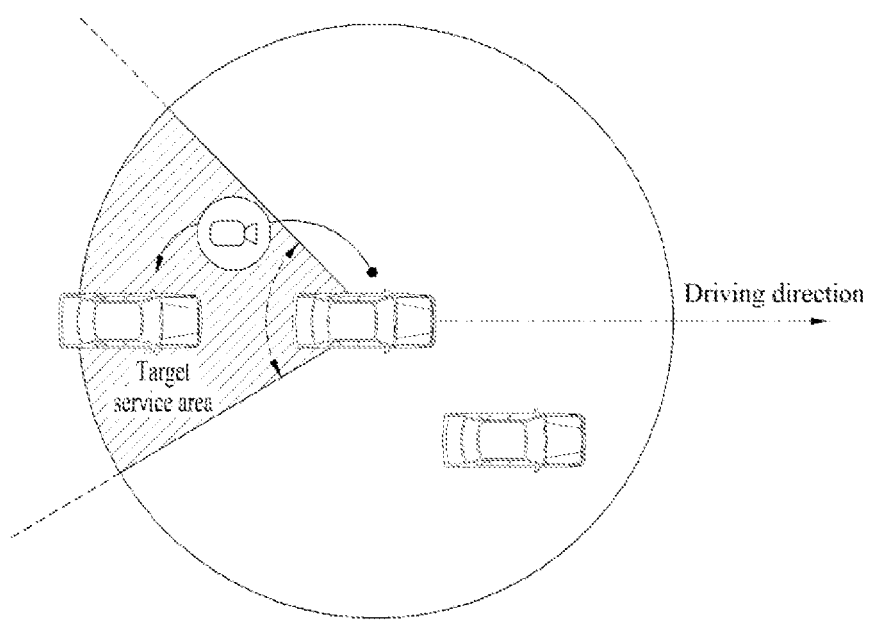
FIG. 10 is a diagram to describe an HARQ feedback method in V2X.

FIG. 10 is a diagram to describe an HARQ feedback method in V2X.

In NR V2X, discussions are taking place on an HARQ feedback method. Specifically, regarding the HARQ feedback for groupcast, a first option in which a Rx UE performs only NACK feedback and a second option in which a Rx UE performs ACK/NACK feedback are discussed as an HARQ feedback method.

In addition, an HARQ feedback method related to groupcast may include an HARQ feedback method based on a distance between Tx and Rx UEs. In this case, only a Rx UE located in a radius with reference to a communication range requirement may perform HARQ feedback and a Rx UE located out of the radius may not perform HARQ feedback.

This is to specify target Rx UEs substantially requiring HARQ feedback as UEs located within a communication range requirement distance. So to speak, Rx UEs located in a distance farther than a communication range requirement have less necessity for system optimization or performance improvement according to the HARQ feedback.

Or, in HARQ feedback based on a distance between a Tx UE and a Rx UE of NR V2X, 'distance between Tx UE and Rx UE (i.e., Tx-Rx distance)' may be matched to a service area of the data packet. For example, the service area may be specified as a service area in a circular shape of a radius (corresponding to the circle in FIG. 10) from a Tx UE, and all UEs located in a 360° radius within the distance from the Tx UE may be considered or specified as potential Rx UEs for the data packet. Or, using the distance between the Tx and Rx UEs, the service area may be matched to an area that requires the HARQ feedback.

Specifically, a method of HARQ feedback may be defined in NR V2X as Table 5.

TABLE 5

Confirm the following working assumption:
  Working assumption:
    When HARQ feedback is enabled for groupcast, support
    (options as identified in RAN1#95):
      Option 1: Receiver UE transmits only HARQ NACK
      Option 2: Receiver UE transmits HARQ ACK/NACK
Note: RAN1 has not concluded the respective applicability
of option 1 vs. option 2 yet
For at least option 1 based TX-RX distance-based HARQ
feedback for groupcast,
  A UE transmits HARQ feedback for the PSSCH if TX-RX
  distance is smaller or equal to the communication range
  requirement. Otherwise, the UE does not transmit HARQ
  feedback for the PSSCH
    TX UE's location is indicated by SCI associated with the
    PSSCH.
      Details FFS
    The TX-RX distance is estimated by RX UE based on its
    own location and TX UE location.
    The used communication range requirement for a PSSCH is
    known after decoding SCI associated with the PSSCH
      FFS implicit or explicit
      FFS how to define location Meanwhile, various services related to V2X may be provided over vehicle-to-vehicle communication, vehicle-to-BS communication, and/or vehicle-to-RSU communication. Services such as platooning, see-through and sensor data sharing among the various services related to V2X may require an operation related to HARQ feedback to Rx UEs in a predetermined range due to the properties of a service that provides valid information to an adjacent UE or vehicles. So to speak, a sidelink signal or a data packet included in the sidelink signal may be valid for Rx UEs located in a specific radius and/or a specific direction range according to the service properties and may not be valid for Rx UEs located out of the range. In this case, only the Rx UEs for which the sidelink signal or the data packet included in the sidelink signal is valid may be specified as target Rx UEs that will transmit the feedback signal.

For example, UEs joining in platooning may be assumed as driving in a row on a highway or the like toward the same direction, and in a platooning situation, a data packet for platooning may be valid information for Rx UEs located in front and/or rear direction of a vehicle. Namely, in a service related to platooning, reception of a packet for platooning may be valid for Rx UEs located in front and/or rear direction of a vehicle.

A see-through service is a sharing service that one vehicle is provided by another vehicle with front (image) information difficult to acquire with a sensor attached to itself due to an obstacle (e.g., a large vehicle, etc.) located in front. In this case, it is highly probable that a UE transmitting a data packet for a see-through service is a UE located ahead of (in front of) a Rx UE that receives the data packet.

Specifically, a data packet provided in association with such a service as platooning, see-through and the like may not be a data packet valid for a specific UE even if the specific UE located in a specific radius is not located in a prescribed angle range (e.g., a prescribed direction). For example, the data packet according to the see-through corresponds to a data packet not valid for a different UE located in front (e.g., a front of a moving direction) of a Tx UE. Namely, a front image according to the data packet is just a rear image for the different UE. In this case, if feedback for the data packet is performed based on that the different UE is located in the specific radius only, unnecessary feedback transmission and unnecessary transmission resource occupation may occur. In addition, if the different UE transmits NACK to the Tx UE as failing to receive the data packet correctly, retransmission of a data packet unnecessary for the Tx UE may be performed.

Therefore, to minimize or prevent the unnecessary HARQ feedback resource occupation, the unnecessary HARQ feedback transmission, and the unnecessary data packet retransmission, the proposed disclosure may use a specific direction or a specific angle range, in which valid data may be received depending on the V2X service property, as additional information for specifying an HARQ feedback target Rx UE of the data packet.

Referring to FIG. 10, it is highly probable that a Tx UE will transmit data by targeting an Rx UE located in a partial area of a rear side in a surrounding 360° area. So to speak, a Tx UE supportive of a see-through service may transmit a data packet necessary or valid for a prescribed UE in rear. Particularly, vehicle communication that uses an mmWave band may secure coverage by supporting packet transmission over beamforming. In this case, when a Tx UE transmits the data packet using single/multiple Tx beams in a specific direction, UEs located in the specific direction may be specified as Rx UEs targeted by the data packet. In doing so, a UE located in a direction irrespective of a beam direction formed for transmission of the data packet may be a UE that is not predicted as a target Rx UE of the data packet although it is in a close distance from the Tx UE (e.g., between UEs located in a distance according to a communication range requirement).

Namely, in the V2X service such as platooning, see-through and the like, reception of a data packet valid for a partial angle section (or a partial area section) only may be performed even in a specific radius (e.g., a valid target service area) according to the aforementioned Tx-Rx distance. Therefore, 'substantial (valid) target service area' may be limited or specified more accurately in consideration of a specific angle range, which is an additional index, as well as a Tx-Rx distance.

By reflecting such a fact, Rx UEs located in a specific angle range as well as the specific distance may be further limited as feedback targets of the ACK/NACK in the NR V2X related HARQ feedback.

Figure 11:
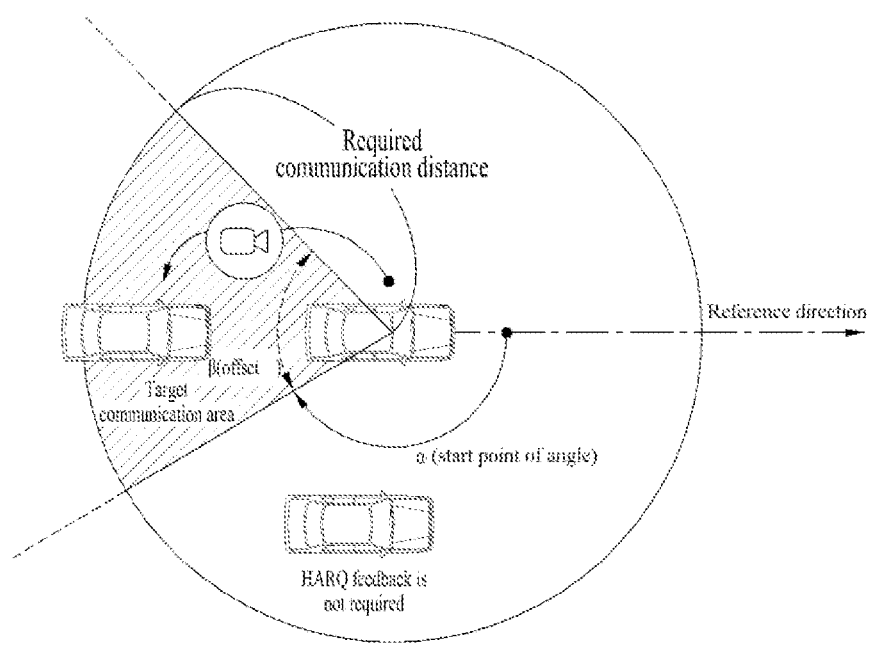
FIG. 11 is a diagram to configure information provided by a Tx UE to specify an HARQ feedback target.

FIG. 11 is a diagram to describe that a Tx UE configures information provided to specify an HARQ feedback target.

First of all, a Tx UE may transmit the following information at least to a target Rx UE over PSCCH (or a first SCI in the aforementioned 2-stage SCI) or a second SCI transmitted by being piggybacked on PSSCH. So to speak, at least one of the following informations may be transmitted to the target Rx UE over the PSCCH as the first SCI or the PSSCH as the second SCI.

QoS field (e.g., minimum required communication range): A minimum required communication range indicated by a QoS field may be a requirement for 'distance' (corresponding to a circle radius of FIG. 10).

Source ID and/or destination ID

Location information of Tx UE: Location information of a Tx UE may be acquired via GPS and/or sensor(s) of a UE, signaling for location information acquisition, or a combination thereof.

Furthermore, a Tx UE may form single/multiple Tx beams toward a target Rx area of a packet to transmit. Specifically, the Tx UE additionally signals information related to a target communication area and/or RSRP information related to the target communication area, thereby requesting only a Rx UE belonging to the corresponding area to report sidelink HARQ feedback.

First of all, referring to FIG. 11, the Tx UE may provide reference direction, start angle and/or offset information as information related to the target communication area. Or, the Tx UE may provide the offset information over information related to a Tx beam.

Specifically, the Tx UE may provide information on a start angle $\alpha$ of a target area calculated with reference to a reference direction (e.g., due north direction) and/or an offset $\beta$ that is an angle range covering the target area to a Rx UE in a manner of including the information in PSCCH. Or, the information on the reference direction, the start angle and the offset may be signaled as a higher layer signal or preconfigured or forwarded based on a zone ID.

First of all, the 'reference direction' may include a direction preconfigured between groupcast UEs (or UEs located in a specific zone or UEs supportive of a specific service) or indicated by higher layer signaling. Or, the reference direction may be indicated dynamically over physical layer signaling in a manner of being selected from a plurality of preconfigured reference directions. For example, the reference direction may be preconfigured based on a progress direction of a specific road, a specific surrounding building, a specific landmark and the like. Or, the reference direction may be preconfigured based on a zone ID, a coverage, and a group ID.

Or, the reference direction may be determined based on directivity (e.g., due south/north direction) in the absolute coordinate system. For example, in case of communication between UEs including a compass, a geomagnetic sensor and the like, the Tx UE may indicate such a direction in a specific absolute coordinate system as due south, due north, due east, due west and the like as the reference direction. Or, the Tx UE may transmit PSCCH including information indicating what direction is a reference direction. For example, the Tx UE may explicitly indicate a start angle and a last angle of the angle range with reference to a reference direction preset between UEs or inform a Rx UE of the start angle and the offset angle $\beta$.

Or, the Tx UE transmits a signal including information on at least one Tx beam, which is in use or is intended to be used, thereby indirectly indicating a start angle and an offset angle (or an end angle) related to the tart communication area. Specifically, considering a vehicle communication environment in a mmWave band, the Tx UE may inform a Rx UE of information on a Tx beam to use (or in use or previously used) for packet transmission, an indicator (e.g., an S-SSB/S-CSI-RS resource index, or an index for a corresponding Tx resource if a different PSCCH/PSSCH Tx resource is linked per Tx beam), and the like. In this case, the Rx UE may infer an $\alpha$ value and/or a $\beta$ value based on the information of the Tx beam or the indicator.

For example, the Tx UE may provide information on a Tx beam index corresponding to the start angle and the offset to the Rx UE, and the Rx UE may infer information on the corresponding start angle and the corresponding offset angle based on the provided Tx beam index. Or, the information on the Tx beam may include a Tx beam index, a beam group index, a Tx beam configuration (e.g., number of beams, beam width), a panel index (in case of a multi-panel), an antenna port group index, and/or the like.

Or, groupcast UEs (or UEs located in a specific zone or UEs supportive of a specific service) may be mutually aware of a beam indexing method or rule, or information from which the beam index may be inferred and information on the Tx beam may be transmitted therebetween. In this case, a Rx UE may acquire or calculate information on an angle range or a communication area covered by the Tx beam based on the beam indexing related information and the information on the Tx beam (or index information). Here, the information on the beam indexing method/rule may include information related to a beam width, an angle with an adjacent beam, a direction/reference for beam numbering, and/or the like.

Or, a Tx UE may further include indexing information, which includes an index/number of an antenna panel used for transmission by the Tx UE, an antenna port number included in the corresponding panel, an antenna port group number included in the corresponding panel and/or the like, in the information on the Tx beam and then transmit it to the Rx UE. This is because there may be limitation on a beam direction that can be formed by each (distributed) antenna panel in case of a UE having a plurality of antenna panels. For example, a panel located at a front bumper of a vehicle may form a beam toward a front 180° direction and a panel located at a rear bumper may form a rear 180° direction. Based on the indexing information, the Rx UE may calculate/acquire angle range information on the target communication area. In this case, information on an antenna panel numbering method/rule, an area/angle of a beam formed by each antenna panel and/or the like may be preconfigured or signaled in advance between the Tx and Rx UEs.

Or, over the combination of the above-described methods, a start angle, an offset angle (or an end angle) related to the target communication area may be calculated or inferred. For example, a Tx UE may indicate a start angle ($\alpha$ of FIG. 11) and also indicate beam width(s) of Tx beam(s) used for transmission by itself with reference to the angle, thereby providing information on the offset angle ($\beta$ of FIG. 11). Or, the Tx UE provides information on the start angle, the number of beams to use and beam width, and the Rx UE calculates the offset value over the information on the number of the beams and the beam width, thereby determining the target communication area according to the start angle and the offset angle.

Or, the Tx UE may provide an RSRP threshold measured/calculated over PSCCH DMRS related to the target communication area as the RSRP information. The RSRP information may be provided from PSCCH or preconfigured/signaled. In this case, the Rx UE may determine whether to perform HARQ feedback for a received packet based on the RSRP threshold included in the RSRP information and a measured RSRP value (e.g., ab RSRP value calculated over PSCCH DMRS and/or PSSCH DMRS). For example, if the calculated RSRP value is equal to or smaller than the RSRP threshold, the Rx UE may not perform the HARQ feedback related to the received packet. Namely, the Rx UE may determine that it is not a target UE of the received packet. If the calculated RSRP value is equal to or greater than the RSRP threshold, the Rx UE may perform an operation of transmitting or reporting the HARQ feedback to the Tx UE. Namely, the Rx UE may recognize that it is the target UE of the received packet.

Figure 12:
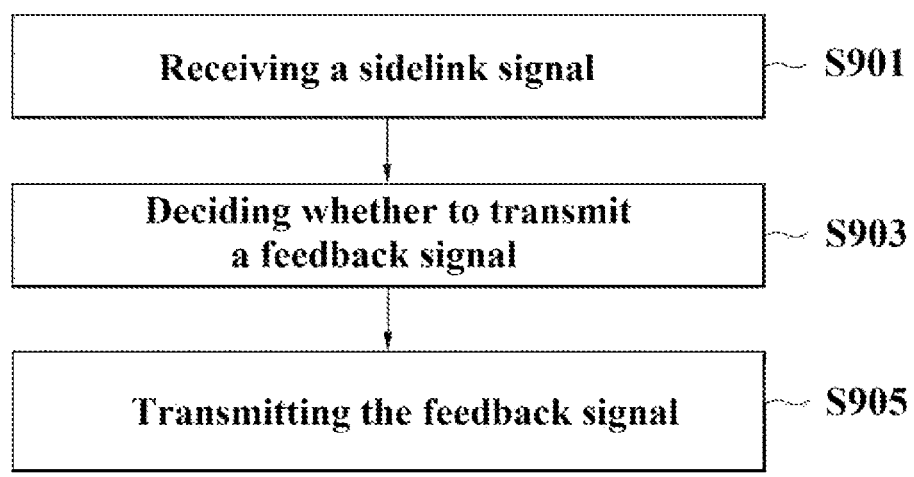
FIG. 12 is a flowchart to describe a method of transmitting a feedback signal by a Rx UE having received a sidelink signal.

FIG. 12 is a flowchart to describe a method of transmitting a feedback signal by a Rx UE having received a sidelink signal.

Referring to FIG. 12, a Rx UE may receive a sidelink signal from a Tx UE [S901]. Here, the sidelink signal may include a PSSCH, a PSCCH, a PSBCH, a PSS, or a signal containing information related to a V2X service.

In some implementations, the sidelink signal may contain information for specifying a target Rx UE becoming a feedback target based on a service that is to be provided. Here, the information may be a first SCI contained in the PSCCH or forwarded to the Rx UE over a second SCI piggybacked on the PSSCH. For example, if the sidelink signal is related to a V2X service requiring a specific directivity, the sidelink signal may contain the angle information for specifying the target Rx UE. Or, if the sidelink signal is related to a service of providing a valid data packet to UEs located in a specific range, it may contain distance information or RSRP threshold information for specifying the target Rx UEs. Or, if the sidelink signal is related to a service for providing a valid data packet to UEs located in a specific direction within a specific range, it may contain the distance information (and/or the RSRP threshold) and the angle information.

In some implementations, the angle information for specifying the target Rx UE may be acquired from beam information used to determine a Tx or Rx beam of the sidelink signal. The beam information used to determine the Tx or Rx beam of the sidelink signal may include informations necessary for beam pair formation, such as informations including a direction of a beam necessary to form a beam pair and the like, a beam width, the number of beam(s), an antenna port index linked to a beam, a resource index of SSB, a resource index of CSI-RS (e.g., acquiring a linked beam index based on a resource index of SSB and/or a resource index of CSI-RS), etc. In this case, the Rx UE may acquire the angle information from the beam information and determine whether to transmit the feedback signal based on the angle information. Or, the information provided from the sidelink signal may include the beam information itself, and the Rx UE may acquire angle information based on the beam information. In this case, the Rx UE may determine whether to transmit a feedback signal corresponding to the sidelink signal by confirming whether the Rx UE is located in an angle range specified based on the angle information.

Based on the received sidelink signal, the Rx UE may determine whether to transmit a feedback signal for the sidelink signal [S903]. The sidelink signal may include informations for specifying a target UE to which the feedback signal will be transmitted. Specifically, the sidelink signal includes a data packet related to the specific service and may include angle information, distance information and/or RSRP threshold information to specify a target to transmit the feedback signal thereto. In this case, based on at least one of the angle information, the distance information and the RSRP threshold information included in the sidelink signal, the Rx UE may determine whether to transmit the feedback signal for the sidelink signal. In addition, the sidelink signal may include location information on the Tx UE.

The Rx UE may determine whether to transmit a feedback signal corresponding to the sidelink signal based on angle information included in the sidelink signal. Specifically, the Rx UE may acquire a start angle and an offset angle from the angle information or obtain information on the start angle and the end angle. In addition, the Rx UE may acquire information on a first reference direction, which is a reference direction for specifying a prescribed angle range based on the start angle and the end angle, from the sidelink signal or receive the information over a higher layer signal in advance with respect to transmission of a feedback signal. Or, the reference direction may be preset based on a zone ID, a coverage or a group ID. The Rx UE may specify the angle range by specifying a location of the start angle and a location of the end angle. Alternatively, the Rx UE may specify the angle range by specifying the start position with reference to the reference direction and applying the offset angle in a clockwise or counterclockwise direction (preconfigured for a direction or included in the sidelink signal). Or, the first reference direction may include a specific direction indicated by the sidelink signal among a plurality of preconfigured reference directions.

Or, the Rx UE may acquire angle information for determining whether to transmit the feedback signal based on the information on the Tx beam included in the angle direction. For example, the Rx UE obtains index information on at least one Tx beam used or to be used by the Tx UE from the sidelink signal and may then acquire start angle and offset information for specifying the angle range based on the acquired index information. For example, the Rx UE may acquire a start angle based on a direction of a Tx beam of the lowest (or highest) index among indexes of the at least one or more Tx beams and include information on the offset angle (e.g., based on a beam width, the number of beams, etc.) based on the number of the at least one or more Tx beams. Or, the sidelink signal may include an indexing method of the Tx beams or information on a beam width of a Tx beam, and the Rx UE may estimate or specify the start angle and the offset angle by indexing the Tx beams based on the indexing method and/or the information on the beam width.

Or, the sidelink signal may include information on a resource index of SSB linked to the Tx beam and/or a resource index of CSI-RS as the angle information. In this case, the Rx UE may acquire index information of at least one Tx beam used or to be used by the Tx UE based on the information on the resource index of the SSB linked to the Tx beam and/or the resource index of the CSI-RS, which is included in the sidelink signal. Or, the Rx UE may specify the angle range based on the acquired index information of the at least one Tx beam using the above-described method.

According to the above-described methods, when the Rx UE specifies the angle range, if the Rx UE is located in the angle range, the Rx UE recognizes that it is a target Rx UE for the sidelink signal and may transmit a feedback signal to the Tx UE. In this case, as described above, the Rx UE may specify the angle range by applying the start angle and the offset angle with reference to the first reference direction centering on a location of the Tx UE based on the sidelink signal.

In some implementations, the angle information may be preconfigured based on a zone ID or a V2X service without being acquired from the sidelink signal. For example, a first angle range may be preconfigured if the V2X service is see-through. A second angle range may be preconfigured if the V2X service is platooning. The Rx UE may specify the corresponding angle range based on information on the V2X service related to the sidelink signal.

Or, the Rx UE may receive a sidelink signal including the angle information and information on the threshold distance. In this case, the Rx UE may determine whether to transmit the feedback signal based on the angle information and the information on the threshold distance included in the sidelink signal. In this case, the Rx UE may calculate a distance from a Tx UE based on location information on the Tx UE included in the sidelink signal and determine whether the calculated distance is within the threshold distance. If the calculated distance is within the threshold distance and the Rx UE itself is located in the angle range acquired from the angle information over the above-described method, the Rx UE may determine the transmission of the feedback signal corresponding to the sidelink signal.

Or, the Rx UE may receive a sidelink signal including angle information and RSRP threshold information. In this case, based on the angle information and the RSRP threshold information included in the sidelink signal, the Rx UE may determine whether to transmit the feedback signal. The Rx UE may measure an RSRP for a reference signal related to the sidelink signal and then compare the measured RSRP with the RSRP threshold. If the measured RSRP is equal to or greater than or exceeds the RSRP threshold and the Rx UE is located within the angle range specified by the above-described method, the Rx UE may determine to transmit the feedback signal for the sidelink signal. Namely, the Rx UE may recognize that it is a target Rx UE for the sidelink signal.

Or, the Rx UE may receive a sidelink signal including information on a threshold distance, angle information and RSRP threshold information. In this case, if the measured RSRP value is equal to or greater than the threshold, the measured distance is equal to or smaller than the threshold distance, and the Rx UE is located in the specified angle range, the Rx UE may recognize that it is a target Rx UE to transmit a feedback signal responsive to the sidelink signal.

Thus, the Rx UE may differently determine whether to transmit a feedback signal responsive to the sidelink signal depending on what kind of information related to the transmission of the feedback signal is included in the sidelink signal. Namely, the Rx UE may determine whether to transmit the feedback signal or whether the Rx UE is a target Rx UE of the sidelink signal in a manner of coping with the information included in the sidelink signal.

Subsequently, if the Rx UE is determined or recognized as the target Rx UE for the sidelink signal or determines to transmit the feedback signal for the sidelink signal according to the above-described methods, the Rx UE may transmit a feedback signal responsive to the sidelink signal [S905]. Here, the feedback signal may include an ACK/NACK signal indicating acknowledgement/non-acknowledgement of the sidelink signal. Namely, the feedback signal may include a feedback signal according to an HARQ procedure. In addition, the feedback signal may be transmitted on Physical Sidelink Feedback Channel (PSFCH) preconfigured in relation to the sidelink signal.

On the other hand, if the Rx UE is not determined as the target Rx UE for the sidelink signal or determines not to transmit the feedback signal for the sidelink signal according to the above-described methods, the Rx UE may drop the sidelink signal or stop decoding.

In this case, the proposed disclosure limits transmission of a feedback signal for a Rx UE, of which sidelink signal or a data packet included in the sidelink signal is not valid, thereby efficiently managing a feedback resource and minimizing battery consumption attributed to unnecessary feedback signal transmission. And, signaling load due to the unnecessary feedback signal transmission can be minimized.

Figure 13:
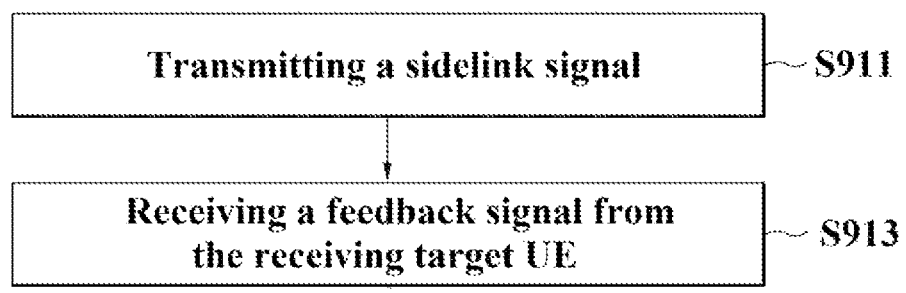
FIG. 13 is a flowchart to describe a method of specifying a target Rx UE to transmit a feedback signal for a sidelink signal to be transmitted by a Tx UE.

FIG. 13 is a flowchart to describe a method of specifying a target Rx UE to transmit a feedback signal for a sidelink signal to be transmitted by a Tx UE.

Referring to FIG. 13, the Tx UE may transmit (e.g., unicast, groupcast or broadcast) the sidelink signal to the at least one Rx UE [S911]. Here, the sidelink signal may include a PSSCH, a PSCCH, a PSBCH, a PSS, or a signal containing information related to a V2X service.

The Tx UE may include information for specifying a Rx UE, which will transmit a feedback signal, in the sidelink signal. Namely, the sidelink signal may include a data packet for a specific service, and also include informations for specifying target Rx UEs that will receive the data packet validly. For example, the sidelink signal may include angle information, distance information and/or RSRP threshold information for specifying a target that will transmit the feedback signal. In this case, based on at least one of the angle information, the distance information and the RSRP threshold information included in the sidelink signal, a Rx UE to transmit a feedback signal for the sidelink signal may be specified among the at least one or more Rx UEs. In addition, the sidelink signal may include location information on the Tx UE.

So to speak, the sidelink signal may contain information for specifying a target Rx UE becoming a feedback target based on a service that is to be provided. For example, if the sidelink signal is related to a V2X service requiring a specific directivity, the sidelink signal may contain the angle information for specifying the target Rx UE. Or, if the sidelink signal is related to a service of providing a valid data packet to UEs located in a specific range, it may contain distance information or RSRP threshold information for specifying the target Rx UEs. Or, if the sidelink signal is related to a service for providing a valid data packet to UEs located in a specific direction within a specific range, it may contain the distance information (and/or the RSRP threshold) and the angle information.

The Tx UE may transmit the sidelink signal including angle information to the at least one Rx UE. The angle information may include information on a start angle and an end angle. The Tx UE may transmit the sidelink signal including information on a first reference direction that is a reference direction for specifying a prescribed angle range based on the start angle and the end angle. In addition, the Tx UE may include information on a direction for rotating by the offset angle from the start angle in the sidelink signal. Or, the first reference direction and/or the information on the direction may be forwarded in advance over a higher layer signal in relation to transmission of the feedback signal or preconfigured based on a zone ID, a coverage or a group ID. Namely, the Tx UE may specify a target Rx UE of the sidelink signal (or a V2X service intended to be provided over the sidelink signal) using the first reference direction and the angle information. For example, having received the angle information, the Rx UE may specify the start location with reference to the reference direction and also specify the angle range by applying the offset angle in a clockwise or counterclockwise direction (preconfigured for a direction or included in the sidelink signal). Or, the first reference direction may include a specific direction indicated by the sidelink signal among a plurality of preconfigured reference directions.

Or, the Tx UE may provide information on a Tx beam as the angle information to the at least one or more Rx UEs. For example, the Tx UE may transmit the sidelink signal including index information on at least one Tx beam used or to be used for the transmission of the sidelink signal by the Tx UE. In this case, the Rx UE may acquire start angle and offset information for specifying the angle range based on the index information. In addition, the Rx UE may acquire a start angle based on a direction of a Tx beam of the lowest (or highest) index among indexes of the at least one or more Tx beams and include information on the offset angle based on the number of the at least one or more Tx beams. Or, the sidelink signal may include an indexing method of the Tx beams or information on a beam width of a Tx beam, and the Rx UE may estimate or specify the start angle and the offset angle by indexing the Tx beams based on the indexing method and/or the information on the beam width.

Or, the sidelink signal may include information on a resource index of SSB linked to the Tx beam and/or a resource index of CSI-RS as the angle information. Namely, the Tx UE may provide the Rx UE with index information of at least one Tx beam used indirectly or intended to be used over the information on the resource index of SSB linked to the Tx beam and/or a resource index of CSI-RS, which is included in the sidelink signal. In this case, the Rx UE may specify the angle range based on the acquired index information of the at least one Tx beam using the above-described method.

According to the above-described methods, the Tx UE may provide angle information for specifying the angle range to the Rx UE, and specify a target Rx UE, which will feed back the sidelink signal, over the angle information.

In some implementations, the angle information may be preconfigured based on a zone ID or a V2X service without being acquired from the sidelink signal. For example, a first angle range may be preconfigured if the V2X service is see-through. A second angle range may be preconfigured if the V2X service is platooning. The Tx UE provides information on the V2X service related to the sidelink signal over the sidelink signal, thereby specifying the angle range corresponding to the V2X service.

Or, the Tx UE may transmit a sidelink signal including the angle information and information on the threshold distance. In this case, the Tx UE may specify a target Tx UE, which will transmit the feedback signal responsive to the sidelink signal, over the angle information and the information on the threshold distance included in the sidelink signal. For example, the Rx UE may calculate a distance from a Tx UE based on location information on the Tx UE included in the sidelink signal and determine whether the calculated distance is within the threshold distance. If the calculated distance is within the threshold distance and the Rx UE itself is located in the angle range acquired from the angle information over the above-described method, the Rx UE may determine the transmission of the feedback signal corresponding to the sidelink signal.

Or, the Tx UE may transmit a sidelink signal including angle information and RSRP threshold information. In this case, over the angle information and the RSRP threshold information included in the sidelink signal, the Tx UE may specify a target Rx UE to transmit the feedback signal. For example, the Rx UE may measure an RSRP for a reference signal related to the sidelink signal and then compare the measured RSRP with the RSRP threshold. If the measured RSRP is equal to or greater than or exceeds the RSRP threshold and the Rx UE is located within the angle range specified by the above-described method, the Rx UE may determine to transmit the feedback signal for the sidelink signal.

Or, the Tx UE may transmit a sidelink signal including information on a threshold distance, angle information and RSRP threshold information. In this case, if the measured RSRP value is equal to or greater than the threshold and the measured distance is equal to or smaller than the threshold distance, the Tx UE may specify a Rx UE located in the specified angle range as a target Rx UE to transmit a feedback signal responsive to the sidelink signal.

Thus, the Tx UE may differently specify target Rx UEs, which will transmit a feedback signal responsive to a sidelink signal, depending on what kind of information related to transmission of the feedback signal is included in the sidelink signal. Namely, the Tx UE may receive the feedback signal from Rx UEs specified in a manner of coping with the information included in the sidelink signal.

Subsequently, the Tx UE may receive a feedback signal from a Rx UE specified as a target Rx UE that will transmit the feedback signal for the sidelink signal according to the above-described methods [S913]. Here, the feedback signal may include an ACK/NACK signal indicating acknowledgement/non-acknowledgement of the sidelink signal. Namely, the feedback signal may include a feedback signal according to an HARQ procedure. In addition, the feedback signal may be transmitted on PSFCH preconfigured in relation to the sidelink signal.

Meanwhile, the Tx UE does not receive a feedback signal for the sidelink signal from Rx UEs not specified according to the above-described methods, thereby preventing retransmission of the sidelink signal responsive to the unnecessary NACK.

Communication System Example to which the Present Invention is Applied

Although not limited thereto, various descriptions, functions, procedures, proposals, methods, and/or operational flow charts of the present invention disclosed in this document may be applied to various fields requiring wireless communication/connection (5G) between devices.

Hereinafter, it will be illustrated in more detail with reference to the drawings. In the following drawings/description, the same reference numerals may exemplify the same or corresponding hardware blocks, software blocks, or functional blocks, unless otherwise indicated.

Figure 14:
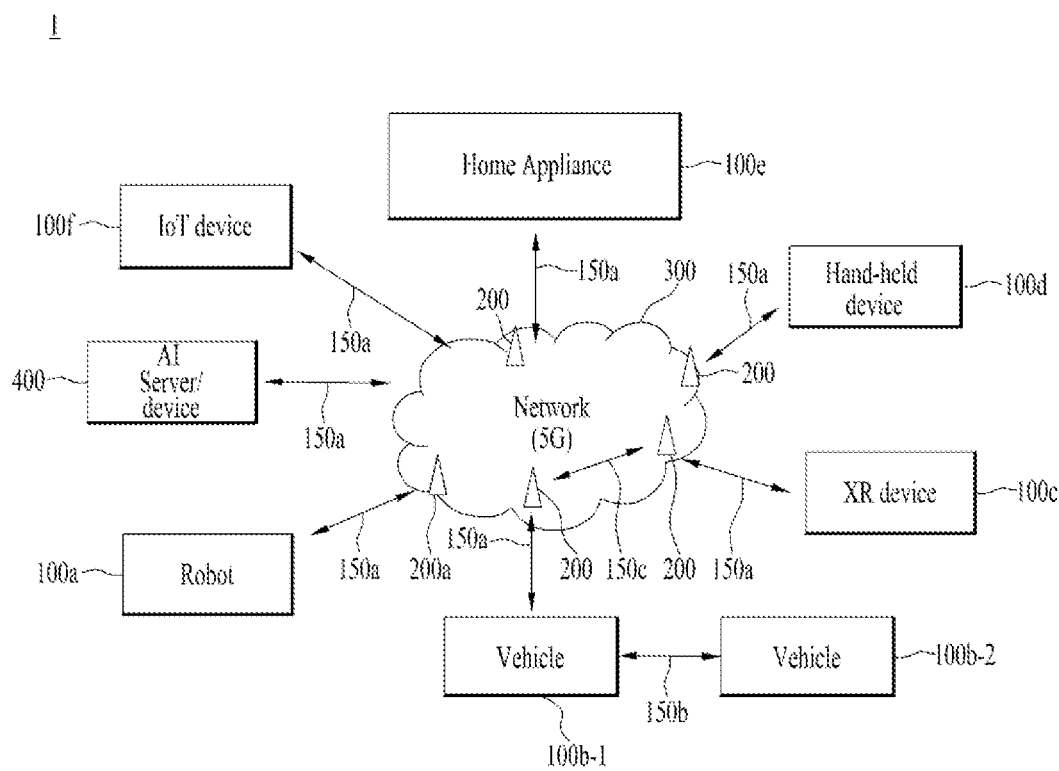
FIG. 14 illustrates a communication system applied to the present invention.

FIG. 14 illustrates a communication system applied to the present invention.

Referring to FIG. 14, a communication system 1 applied to the present invention includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous driving vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present invention.

Examples of Wireless Devices to which the Present Invention is Applied

Figure 15:
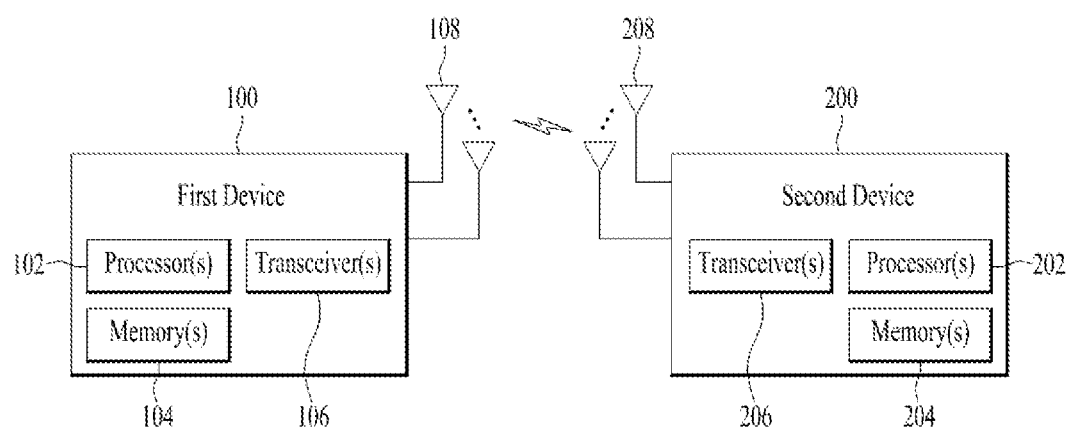
FIG. 15 illustrates wireless devices applicable to the present invention.

FIG. 15 illustrates a wireless device applicable to the present invention.

Referring to FIG. 15, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 14.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information acquired by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present invention, the wireless device may represent a communication modem/circuit/chip.

Specifically, the UE may include a processor 102 connected to the RF transceiver and a memory 104. The memory 104 may include at least one or more programs capable of executing operations related to the embodiments described in FIGS. 10 to 23.

The processor 102 receives a sidelink signal from a second UE by controlling the RF transceiver and determines whether to transmit a feedback signal for the first sidelink signal based on the sidelink signal. The sidelink signal includes angle information related to the transmission of the feedback signal, and whether to transmit the feedback signal may be determined based on the angle information. The processor 102 may determine whether to transmit a feedback signal according to embodiments for determining whether the transmission of the feedback signal is necessary described in FIGS. 10 to 13 based on a program included in the memory 104 and then perform the corresponding transmission of the feedback signal.

Or, a chipset including the processor 102 and the memory 104 may be configured. In this case, the chipset includes at least one processor and at least one memory operatively connected to the at least one processor and enabling the at least one processor to perform an operation when executed. The operation includes receiving a sidelink signal from another UE and determining whether to transmit a feedback signal for the first sidelink signal based on the sidelink signal. The sidelink signal includes angle information related to the transmission of the feedback signal, and whether to transmit the feedback signal may be determined based on the angle information. In addition, the operation may perform an embodiment of determining whether it is a transmission target of the feedback signal, which is described in FIGS. 10 to 13, based on a program included in the memory 104 and embodiments of transmitting a feedback signal based on a result of the determination.

Or, a computer-readable storage medium including at least one computer program to enable the at least one processor to perform an operation is provided. The operation includes receiving a sidelink signal from another UE and determining whether to transmit a feedback signal for the first sidelink signal based on the sidelink signal. The sidelink signal includes angle information related to the transmission of the feedback signal, and whether to transmit the feedback signal may be determined based on the angle information. In addition, the operation may perform an embodiment of determining whether it is a transmission target of the feedback signal, which is described in FIGS. 10 to 13, based on a program included in the memory 104 and embodiments of transmitting a feedback signal based on a result of the determination.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information acquired by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present invention, the wireless device may represent a communication modem/circuit/chip.

The processor 202 transmits a sidelink signal to at least one first UE by controlling the RF transceiver and receives a feedback signal for the first sidelink signal. The sidelink signal includes angle information for specifying a transmission target of the feedback signal, and the feedback signal may be received from a first UE located in an angle range corresponding to the angle information among the at least one or more first UEs. The processor 202 includes informations for specifying a feedback target UE in the sidelink signal described in FIGS. 10 to 13 based on a program included in the memory 204 and may perform embodiments of receiving a feedback signal for the sidelink signal from a Rx UE specified according to the included informations.

Or, a chipset including the processor 102 and the memory 104 may be configured. In this case, the chipset includes at least one processor and at least one memory operatively connected to the at least one processor and enabling the at least one processor to perform an operation when executed. The operation includes transmitting a sidelink signal to at least one first UE and receiving a feedback signal for the first sidelink signal. The sidelink signal includes angle information for specifying a transmission target of the feedback signal, and the feedback signal may be received from a first UE located in an angle range corresponding to the angle information among the at least one or more first UEs. The processor 202 includes informations for specifying a feedback target UE in the sidelink signal described in FIGS. 10 to 13 based on a program included in the memory 204 and may perform embodiments of receiving a feedback signal for the sidelink signal from a Rx UE specified according to the included informations.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Examples of Wireless Devices to which the Present Invention is Applied

Figure 16:
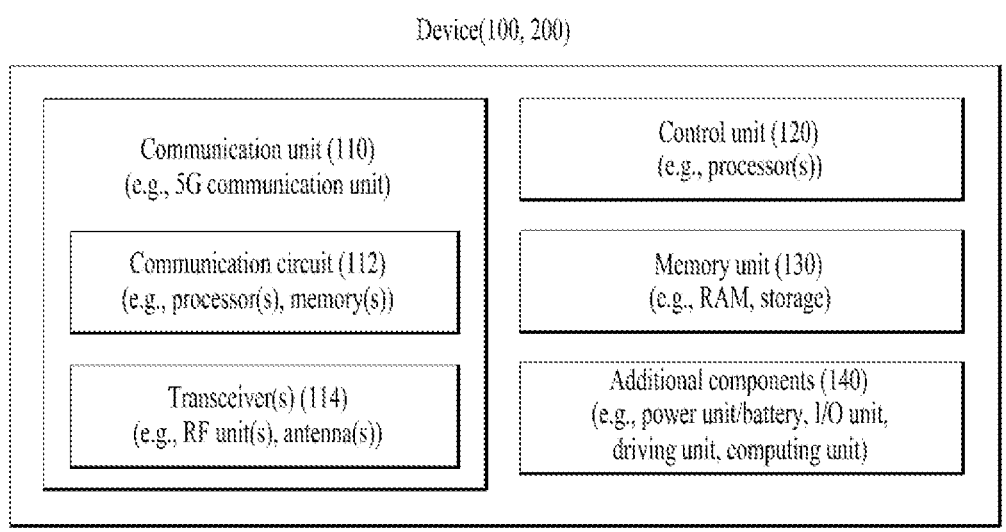
FIG. 16 illustrates another example of a wireless device to which the present invention is applied. The wireless device may be implemented in various forms according to use-examples/services.

FIG. 16 illustrates another example of a wireless device applied to the present invention. The wireless device may be implemented in various forms according to a use-case/service (refer to FIG. 14)

Referring to FIG. 16, wireless devices 100 and 200 may correspond to the wireless devices 100 and 200 of FIG. 15 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 15. For example, the transceiver(s) 114 may include the one or more transceivers 106 and 206 and/or the one or more antennas 108 and 208 of FIG. 15. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 14), the vehicles (100b-1 and 100b-2 of FIG. 14), the XR device (100c of FIG. 14), the hand-held device (100d of FIG. 14), the home appliance (100e of FIG. 14), the IoT device (100f of FIG. 14), a digital broadcast terminal, a hologram device, a public safety device, an MTC device, a medicine device, a fintech device (or a finance device), a security device, a climate/environment device, the AI server/device (400 of FIG. 14), the BSs (200 of FIG. 14), a network node, etc. The wireless device may be used in a mobile or fixed place according to a use-example/service.

In FIG. 16, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Figure 17:
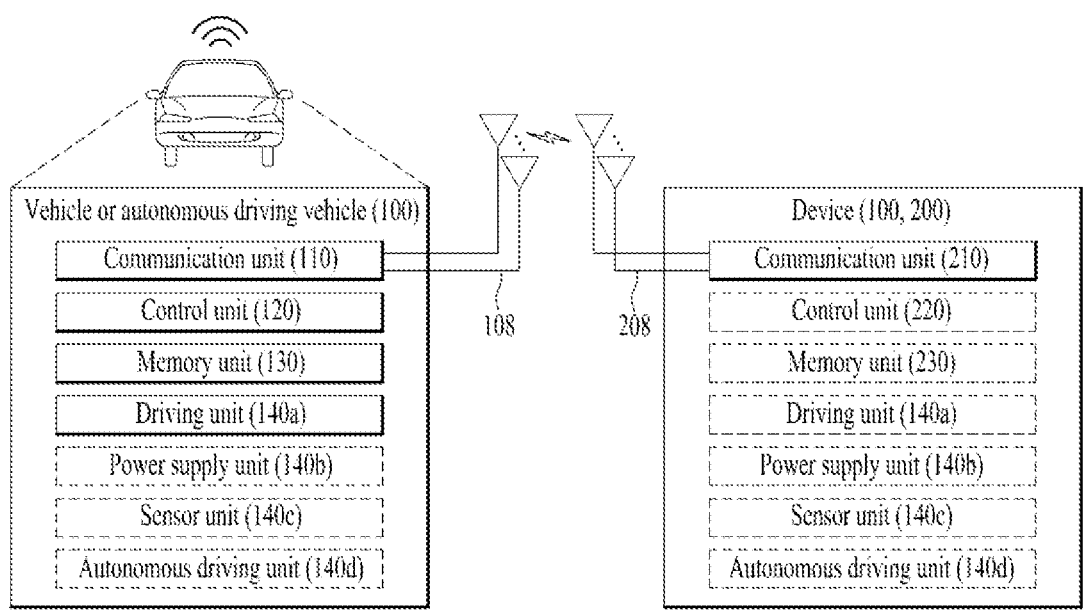
FIG. 17 illustrates a vehicle or an autonomous driving vehicle applied to the present invention.

Examples of Vehicles or Autonomous Vehicles to which the Present Invention is Applied FIG. 17 illustrates a vehicle or an autonomous driving vehicle applied to the present invention. The vehicle or autonomous driving vehicle may be implemented by a mobile robot, a car, a train, a manned/unmanned Aerial Vehicle (AV), a ship, etc.

Referring to FIG. 17, a vehicle or autonomous driving vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 16, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an Electronic Control Unit (ECU). Also, the driving unit 140a may cause the vehicle or the autonomous driving vehicle 100 to drive on a road. The driving unit 140a may include an engine, a motor, a powertrain, a wheel, a brake, a steering device, etc. The power supply unit 140b may supply power to the vehicle or the autonomous driving vehicle 100 and include a wired/wireless charging circuit, a battery, etc. The sensor unit 140c may acquire a vehicle state, ambient environment information, user information, etc. The sensor unit 140c may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140d may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140d may generate an autonomous driving path and a driving plan from the acquired data. The control unit 120 may control the driving unit 140a such that the vehicle or the autonomous driving vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140c may obtain a vehicle state and/or surrounding environment information. The autonomous driving unit 140d may update the autonomous driving path and the driving plan based on the newly acquired data/information. The communication unit 110 may transfer information about a vehicle position, the autonomous driving path, and/or the driving plan to the external server. The external server may predict traffic information data using AI technology, etc., based on the information collected from vehicles or autonomous driving vehicles and provide the predicted traffic information data to the vehicles or the autonomous driving vehicles.

The embodiments described above are those in which components and features of the present invention are combined in a predetermined form. Each component or feature should be considered optional unless explicitly stated otherwise. Each component or feature may be implemented in a form that is not combined with other components or features. In addition, it is also possible to constitute an embodiment of the present invention by combining some components and/or features. The order of operations described in the embodiments of the present invention may be changed. Some configurations or features of one embodiment may be included in other embodiments, or may be replaced with corresponding configurations or features of other embodiments. It is obvious that the embodiments may be configured by combining claims that do not have an explicit citation relationship in the claims or may be included as new claims by amendment after filing.

In this document, embodiments of the present invention have been mainly described based on a signal transmission/reception relationship between a terminal and a base station. Such a transmission/reception relationship is extended in the same/similar manner to signal transmission/reception between a terminal and a relay or a base station and a relay. A specific operation described as being performed by a base station in this document may be performed by its upper node in some cases. That is, it is obvious that various operations performed for communication with a terminal in a network comprising a plurality of network nodes including a base station may be performed by the base station or network nodes other than the base station. The base station may be replaced by terms such as a fixed station, a Node B, an eNode B (eNB), an access point, and the like. In addition, the terminal may be replaced with terms such as User Equipment (UE), Mobile Station (MS), Mobile Subscriber Station (MSS).

In a hardware configuration, the embodiments of the present disclosure may be achieved by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, a method according to embodiments of the present disclosure may be implemented in the form of a module, a procedure, a function, etc. Software code may be stored in a memory unit and executed by a processor. The memory unit is located at the interior or exterior of the processor and may transmit and receive data to and from the processor via various known means As described before, a detailed description has been given of preferred embodiments of the present disclosure so that those skilled in the art may implement and perform the present disclosure. While reference has been made above to the preferred embodiments of the present disclosure, those skilled in the art will understand that various modifications and alterations may be made to the present disclosure within the scope of the present disclosure. For example, those skilled in the art may use the components described in the foregoing embodiments in combination. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

INDUSTRIAL APPLICABILITY

The above-described embodiments of the present disclosure are applicable to various mobile communication systems.

What is claimed is:
1. A method of transmitting a feedback signal by a first User Equipment (UE) in a wireless communication system, the method comprising:
  receiving a control signal from a second UE; and
  determining whether to transmit the feedback signal for a first signal based on the control signal,
  wherein whether to transmit the feedback signal is determined based on angle information related to the control signal, and
  wherein the angle information is determined based on a resource index of a SSB (Synchronization Signal/Physical Broadcast Channel block) or a resource index of a CSI-RS (channel state information-reference signal) included in the control signal.
2. The method of claim 1, wherein the feedback signal is transmitted based on the first UE being located in an angle range specified based on the angle information with reference to a first reference direction.
3. The method of claim 1, wherein the control signal further includes information on a threshold distance and wherein the feedback signal is transmitted based on a distance between the first UE and the second UE being within the threshold distance and the first UE being located in an angle range specified based on the angle information with reference to a first reference direction.
4. The method of claim 1, wherein the control signal further includes information on a threshold related to Reference Signal Received Power (RSRP) and wherein the feedback signal is transmitted based on the RSRP measured for the control signal being equal to or greater than the threshold and the first UE being located in an angle range specified based on the angle information with reference to a first reference direction.
5. The method of claim 2, wherein the first reference direction comprises a direction indicated by the control signal among a plurality of preconfigured reference directions.
6. The method of claim 2, wherein the angle range is specified based on a start angle and an offset angle acquired from the angle information.
7. The method of claim 6, wherein the start angle and the offset angle are acquired based on index information, which is included in the angle information, of a Tx beam used by the second UE.
8. The method of claim 1, wherein the control signal comprises a Physical Sidelink Control Channel (PSCCH).
9. A method of receiving a feedback signal by a second User Equipment (UE) in a wireless communication system, the method comprising:
  transmitting a control signal to at least one or more first UEs; and
  receiving the feedback signal for a first signal,
  wherein the feedback signal is received from a first UE located in an angle range corresponding to angle information among the at least one or more first UEs, and
  wherein the angle information is determined based on a resource index of a SSB (Synchronization Signal/Physical Broadcast Channel block) or a resource index of a CSI-RS (channel state information-reference signal) included in the control signal.
10. The method of claim 9, wherein the feedback signal is received from the first UE located in an angle range specified based on the angle information with reference to a first reference direction.
11. The method of claim 9, wherein the control signal further includes information on a threshold distance and wherein the feedback signal is received from the first UE having a distance from the second UE within the threshold distance and located in an angle range specified based on the angle information with reference to a first reference direction.
12. The method of claim 10, wherein the first reference direction is indicated over the control signal.
13. A first User Equipment (UE) transmitting a feedback signal in a wireless communication system, the first UE comprising:
  a Radio Frequency (RF) transceiver; and
  a processor connected to the RF transceiver, the processor configured to receive a control signal from a second UE by controlling the RF transceiver and determine whether to transmit a feedback signal for a first signal based on the control signal,
  wherein whether to transmit the feedback signal is determined based on angle information related to the control signal, and wherein the angle information is determined based on a resource index of a SSB Synchronization Signal/Physical Broadcast Channel block) or a resource index of a CSI-RS (channel state information-reference signal) included in the control signal.

14. A chipset transmitting a feedback signal in a wireless communication system, the chipset comprising:
at least one processor; and
at least one memory operatively connected to the at least one processor and enabling the at least one processor to perform an operation when executed,
the operation comprising:
receiving a control signal from another UE; and
determining whether to transmit the feedback signal for a first signal based on the control signal,
wherein whether to transmit the feedback signal is determined based on angle information related to the control signal, and
wherein the angle information is determined based on a resource index of a SSB (Synchronization Signal/Physical Broadcast Channel block) or a resource index of a CSI-RS (channel state information-reference signal) included in the control signal.

15. A non-transitory computer-readable storage medium including at least one computer program enabling at least one processor to perform an operation of transmitting a feedback signal in a wireless communication system, the computer-readable storage medium comprising:
at least one computer program enabling the at least one processor to perform an operation of transmitting a feedback signal; and
storing the at least one computer program,
wherein the operation comprises receiving a control signal from another UE and determining whether to transmit the feedback signal for a first signal based on the control signal,
wherein whether to transmit the feedback signal is determined based on angle information related to the control signal, and
wherein the angle information is determined based on a resource index of a SSB (Synchronization Signal/Physical Broadcast Channel block) or a resource index of a CSI-RS (channel state information-reference signal) included in the control signal.

* * * * *